United States Patent
Irwin, Jr. et al.

(10) Patent No.: US 11,830,318 B2
(45) Date of Patent: Nov. 28, 2023

(54) METHOD OF AUTHENTICATING A CONSUMER OR USER IN VIRTUAL REALITY, THEREBY ENABLING ACCESS TO CONTROLLED ENVIRONMENTS

(71) Applicant: 8 Bit Development Inc., Mesa, AZ (US)

(72) Inventors: Kenneth E. Irwin, Jr., Dawsonville, GA (US); Eric M. Pilnock, Mesa, AZ (US); Michael T. Day, Mesa, AZ (US); Patricia Mcclay Irwin, Dawsonville, GA (US)

(73) Assignee: 8 BIT DEVELOPMENT INC., Mesa, AZ (US)

( * ) Notice: Subject to any disclaimer, the term of this patent is extended or adjusted under 35 U.S.C. 154(b) by 607 days.

(21) Appl. No.: 17/081,382

(22) Filed: Oct. 27, 2020

(65) Prior Publication Data

US 2021/0134110 A1 May 6, 2021

Related U.S. Application Data

(60) Provisional application No. 62/928,816, filed on Oct. 31, 2019.

(51) Int. Cl.
| | |
|---|---|
| *G07F 17/32* | (2006.01) |
| *H04L 9/06* | (2006.01) |
| *H04L 9/32* | (2006.01) |
| *G06F 21/31* | (2013.01) |
| *H04L 9/00* | (2022.01) |

(52) U.S. Cl.
CPC .......... *G07F 17/3241* (2013.01); *G06F 21/31* (2013.01); *G07F 17/3223* (2013.01); *H04L 9/0643* (2013.01); *H04L 9/3247* (2013.01); *H04L 9/3263* (2013.01); *H04L 9/50* (2022.05)

(58) Field of Classification Search
None
See application file for complete search history.

(56) References Cited

U.S. PATENT DOCUMENTS

| 8,963,806 | B1 | 2/2015 | Starner et al. | |
|---|---|---|---|---|
| 9,633,186 | B2 | 4/2017 | Ingrassia, Jr. et al. | |
| 10,643,433 | B2 | 5/2020 | Pilnock et al. | |
| 10,645,126 | B2 | 5/2020 | Pilnock et al. | |
| 10,755,528 | B2 | 8/2020 | Pilnock et al. | |
| 2016/0085955 | A1* | 3/2016 | Lerner | H04L 9/0869 726/20 |
| 2017/0316639 | A1* | 11/2017 | Lyons | G07F 17/3244 |
| 2019/0051101 | A1* | 2/2019 | Russ | G07F 17/3211 |
| 2020/0264194 | A1 | 8/2020 | Rogers et al. | |
| 2020/0349800 | A1* | 11/2020 | Ciardi | G06Q 30/0209 |

FOREIGN PATENT DOCUMENTS

| WO | 2015109937 A1 | 7/2015 |
|---|---|---|
| WO | 2015172124 A1 | 11/2015 |

* cited by examiner

*Primary Examiner* — Jason T Yen
(74) *Attorney, Agent, or Firm* — Panitch Schwarze Belisario & Nadel LLP

(57) ABSTRACT

A system and method for allowing a plurality of consumers or users to be individually authenticated in a Virtual Reality (VR) environment conducted throughout a VR session accessing a gaming server that dispenses outcomes. The consumer authentications are made possible through the VR device, thereby authorizing continued access to controlled or restricted VR environments.

20 Claims, 13 Drawing Sheets

METHOD OF AUTHENTICATING A CONSUMER OR USER IN VIRTUAL REALITY, THEREBY ENABLING ACCESS TO CONTROLLED ENVIRONMENTS

CROSS-REFERENCE TO RELATED APPLICATIONS

This application claims the benefit of U.S. Provisional Patent Application No. 62/928,816 filed Oct. 31, 2019, the disclosure of which is hereby incorporated by reference herein in its entirety.

FIELD OF THE INVENTION

The present disclosure relates to a system and method for allowing a plurality of consumers or users to be individually authenticated in a Virtual Reality ("VR") environment both initially and with subsequent authentications seamlessly (from the consumer's perspective) conducted throughout a VR session accessing a controlled environment. The serial series of authentications are made possible through the VR device, thereby authorizing continued access to controlled or restricted VR environments—e.g., VR casino or lottery game play. In a specific embodiment, a system and method of authentication is disclosed that enables sequential access to predetermined outcomes typical of Class II gaming.

BACKGROUND

Both "Class III" slot machines and "Class II" Instant Ticket Vending Machines ("ITVMs") enable games of chance to be played with enhanced entertainment and appeal resulting in billions of dollars in revenue worldwide. While slot machines typically rely on some form of Random Number Generator ("RNG") electronically generating real-time results, ITVMs rely on predetermined instant ticket's or pull-tab's prize awards dispensed at the time of play, both types of machines generate profit by essentially allocating a portion of play revenue for prizes with the remainder allocated to expenses and yield.

In the special case of ITVMs, these instant ticket's or pull-tab's prize awards are predetermined with the order of the instant tickets or pull-tabs dispensed determining both when and what prize is awarded on a given play. Thus, with a predetermined prize structure, Class II ITVMs will ulti-mately payout exactly what the loaded "shuffle", "deal", or "pool" of instant tickets or pull-tabs were determined to payout at the time of allocating winners at the factory. In contrast, Class III slot machines rely on the law of large numbers to achieve expected payouts and consequently can deviate from expected values over the short term—e.g., it is theoretically possible that a Class III slot machine could payout two jackpots sequentially. However, as a practical matter, with a sufficient number of plays or "pulls", Class III slot machines typically payout closely to their Expected Value ("EV").

Class II ITVMs came into being as a matter of legal necessity. Class II machines are usually employed by state lotteries, tribal gaming reservations, charitable gaming, and "racinos"—racinos are gambling establishments that allow Class II machines at a live horse track. Often, these insti-tutions are prohibited or severely restricted by law from operating (Vegas style) Class III slot machines. Thus, Class II ITVMs were created to accommodate gaming licenses for these types of institutions.

Most consumers would have a difficult time differentiat-ing between a Class II and a Class III machine with some Class II machines automatically disposing of the "instant ticket" (e.g., barcodes preprinted on paper roll stock) in an internal trash bin so that the tiny slips of paper do not create a cleanup problem for the operating establishment. How-ever, Class II machines typically require higher maintenance and operating costs due to the handling of the physical paper tickets (e.g., paper ticket disposal, paper ticket dispensing, paper ticket security, lower reliability due to moving parts, costs associated with preprinting and transporting paper tickets) when compared to Class III slots. Additionally, there are security concerns with Class II machines that are not typically associated with Class III slots—e.g., if an installer of instant ticket or pull-tab shuffle, deal, or pool can deter-mine the sequence of winning tickets he or she could potentially illicitly profit by only playing the machine when the winning plays were due, thereby leaving only losing plays available to the general public. Moreover, both Class II and Class III machines are typically designed to attract a certain type of customer (e.g., "grinders", "punters", "dis-covery", "jackpot") and located only on the casino floor, thereby consuming valuable casino floor space for only a specific type of consumer. The casino floor location para-digm being driven primarily from the need to monitor play and ensure only valid consumers are in fact utilizing the machines.

Thus, there is a need to modernize or possibly eliminate the need for preprinted ticket or pull-tab stock for determin-ing the outcome of ITVMs while still maintaining compli-ance with existing laws for Class II machines. Additionally, there is a need to provide continuous consumer authentica-tion for both Class II and Class III machines, such that the thread of ongoing play is maintained by the same, autho-rized, consumer no matter where the machine is located. This continuous consumer authentication process enabling individual and group play in various authorized remote locations (e.g., casino hotel rooms, casino pool side) other than the casino floor.

Some notable attempts have been made to provide authen-tication in various environments that could potentially be utilized to modernize Class II gaming as well as enable individual and group play in various authorized remote locations. Notably, U.S. Pat. No. 8,963,806 (Starner et. al.) and U.S. Pat. No. 9,633,186 (Ingrassia Jr. et. al.). However, the '806 ("Starner et. al") patent teaches utilizing a "head-mountable device configured to authenticate a wearer" (Ab-stract) via captured biometric information with no regard (i.e., completely silent) on the unique authentication require-ments of gaming applications in general much less Class II specific applications. Likewise, the '186 (Ingrassia Jr. et. al.) patent discloses "systems and methods for output of content based on human recognition data captured by one or more sensors of an electronic device" (Abstract), which does discuss granting access to content and, optionally, altering content based on detected human recognition data; but, is again completely silent on the unique authentication require-ments of gaming applications.

International applications WO 2015/109937 (Liu et. al.) and WO 2015/172124 (Nelson et. al.) both disclose methods and systems for authenticating consumers via biometric data using wearable (i.e., head-mounted) devices. The '937 (Liu et. al.) application includes a head-mounted device that includes a biometric module (FIG. 1, callout 110) that acquires biometric features to authenticate the consumer against an a priori database. The '124 (Nelson et. al.) application monitors the eye movements and characteristics of the consumer to acquire "eye signals" (paragraph [18]) for authentication of a wireless device to a remote server. Again, neither application anticipates applying authentication to a gaming environment.

Therefore, there is a need to modernize Class II ITVMs while still maintaining compliance with existing laws for Class II machines. Additionally, there is a need to provide continuous consumer authentication for both Class II and Class III machines, which heretofore has not been realized with the prior art.

SUMMARY OF THE INVENTION

Objects and advantages of the present invention will be set forth in part in the following description, or may be obvious from the description, or may be learned through practice of the present invention.

In a preferred embodiment, a method and system are provided for a Virtual Reality ("VR") device, wherein the device provides metrics of the consumer or user as well as his or her surroundings on a one-time, periodic, or continuous basis thereby providing authentication as the consumer advances through real time RNG generated game play (i.e., Class III) or a predetermined set of outcomes (i.e., Class II), such that outcomes will only be revealed and correspondingly archived if a consistent stream of authentications is provided by the VR device. Thus, with the benefit of this invention, the system would (1) utilize the VR device to scan and assess the consumer and associated environment to provide authentication metrics; (2) transmit the authentication metrics that were digitally signed by the VR device from the VR device to a gaming server; (3) utilize the gaming server to validate the digitally signed authentication metrics; and (4) assuming the consumer data validates correctly, the gaming sever transmits to the consumer' VR device (preferably digitally signed outcomes) such that the consumer may view and manage sequential outcomes dispensed by the gaming server on the VR device.

Whenever a wager is made, the VR device interfaces with a game server to commit to the wager if the consumer's account and authentication data are acceptable, subsequently providing a digital receipt and confirmation to the consumer's VR device. Once the wagered event starts, the VR device requests at least one real time RNG or predetermined outcome from the gaming server to determine the status (e.g., win or lose) of the consumer's wager, providing a visual gaming style display (e.g., giant pull-tab reveal, slot machine) of the outcome. Finally, an automated system is provided for the consumer to cash out any winnings.

In an alternative embodiment, a method and system are provided for a VR device to play Bingo with both virtual Bingo 5×5 cards as well as the caller's draws dispensed by the gaming server and wherein the VR device creates a virtual surrounding environment simulating a Bingo betting venue that appear to be in the consumer's surroundings when viewed through the VR device thereby enabling a gaming or gambling experience in any type of setting. Thus, with the benefit of this invention, the VR device would: (1) create a virtual Bingo betting environment with at least one Bingo game displayed; (2) receive at least one virtual 5×5 Bingo card from the gaming server as well as sequential call numbers; (3) via positioning and optionally gestures, the consumer would identify a particular called number on the at least one 5×5 Bingo card and mark it as called, optionally the VR device could automatically mark the called numbers on the virtual 5×5 Bingo card(s); and (4) via positioning and optionally gestures, the consumer would identify when a particular 5×5 Bingo card was a winner with the winning status transmitted to the gaming sever.

In an optional and preferred embodiment, a plurality of consumers simultaneously compete in a shared virtual environment where each consumer can view each other consumer as an avatar or other digitally generated appearance. In this shared virtual environment optional and preferred embodiment, each consumer would still retain their own individual virtual 5×5 Bingo cards assigned by the gaming server thereby enabling direct competition. Finally, in this optional and preferred embodiment, the dispensed virtual 5×5 Bingo cards would be maintained in both the consumer's VR device and game server's non-volatile memories.

As before, whenever a wager (e.g., Bingo game is started by a consumer, slot machine pull, craps game dice throw) is made, the VR device interfaces with the gaming server to commit to the wager if the consumer's account and authentication data are known with a digitally signed receipt and confirmation transmitted back to the consumer's VR device from the gaming sever. Once the wagered event starts, the VR device will provide real time updates (e.g., call numbers, slot machine reel stops) as to the status of the consumer's wager and allow the consumer to announce when he or she has a winner. Finally, an automated system is provided for the consumer to cash out any winnings.

In a preferred alternate embodiment, the authentication metrics transmitted from the VR device to the gaming server are compared to historical authentication metrics stored in a database maintained on the gaming server. Various "fuzzy logic" and other flexible correlation methodologies are then employed to determine if the received authentication metrics "compare" (i.e., authenticate) with the historical metrics. In a preferred specific embodiment, the criterion of whether the pending wager to be authenticated is an "initial" wager or an "ongoing" wager in a series affects the stringency of the criteria for successful comparisons and authentications. In another specific embodiment, the amount of the pending wager also affects the stringency of the criteria for successful comparisons and authentications.

Described are a number of mechanisms and methodologies that provide practical details for reliably implementing a VR system from commonly available hardware that also provides for scalability. Although the examples provided herein are primarily related to I betting in casino environments, it is clear that the same methods are applicable to any type of wagering system in differing locations (e.g., casino hotel room, private home, sports bar).

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
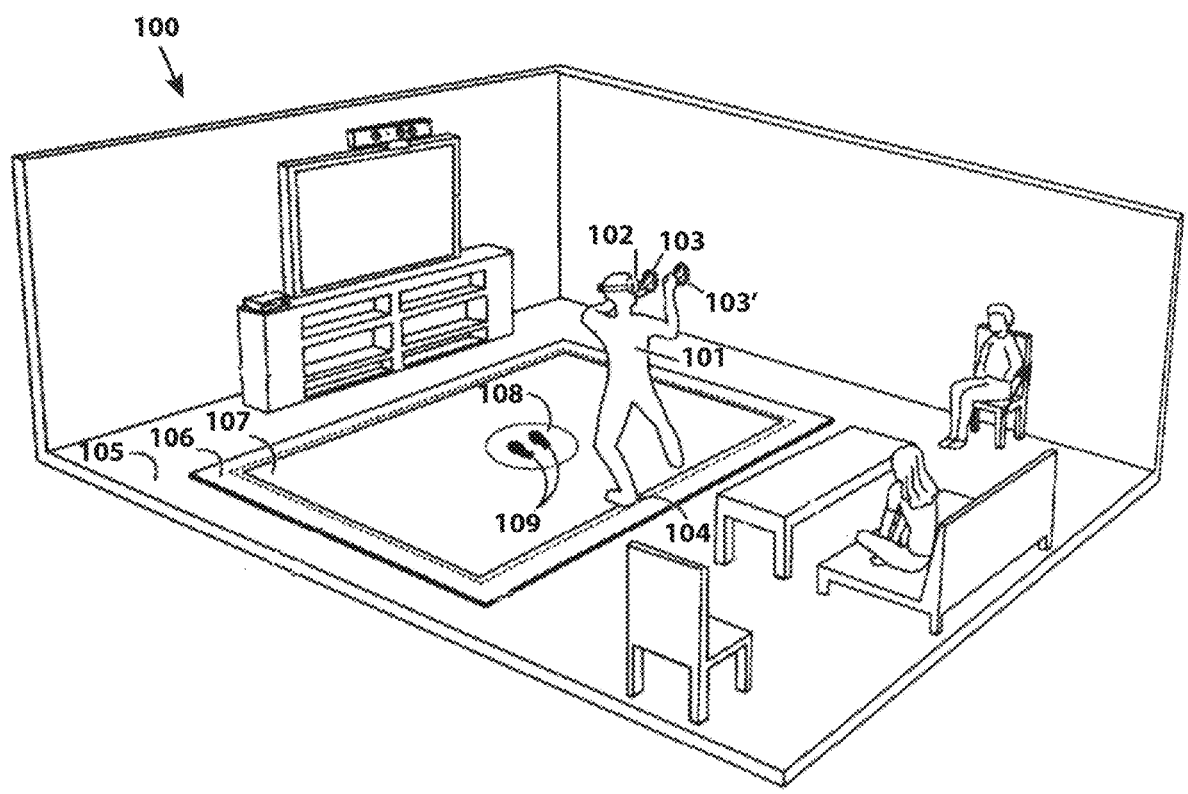
FIG. 1A is a representative example isometric view of a typical VR user device.

Certain terminology is used herein for convenience only and is not to be taken as a limitation on the present invention. The words "a" and "an", as used in the claims and in the corresponding portions of the specification, mean "at least one." The abbreviations "AR" and "VR" denote "Augmented Reality" and "Virtual Reality" respectively. Augmented Reality (AR) is an interactive experience of a real-world environment whose elements are "augmented" by computer-generated perceptual information. While definitions of AR vary depending on the application, in the context of this invention AR denotes constructive (i.e. additive to the natural environment) overlaid visual and possibly audible sensory information seamlessly interwoven into images of the real world. Examples of existing AR platforms are: Apple iPhones®, Android® phones, Google Glass, Microsoft HoloLens, etc. AR augmented computer-generated perceptual information is referred to as "persistent digital objects", or "overlay images", or "visual digital image overlays" interchangeably throughout the specification and claims. In the context of this invention "persistent digital objects", or "overlay images" can be simple two-dimensional overlays of statistics or odds, interactive control panels, or simulated three-dimensional objects. VR, in the context of this disclosure, is an interactive computer-generated experience taking place completely within a simulated environment. VR as used herein denotes complete immersion into the computer-generated experience with no real world environment admitted and may also include audio. Examples of existing VR platforms include: Oculus, Windows Mixed Reality, Google Daydream, HTC Vive.

In the context of the present invention, the terms "shuffle", "deal", or "pool" are used interchangeably meaning a set of predetermined outcomes that are randomly or pseudorandomly dispensed from a gaming server. Likewise, the terms "wager" or "bet" are used interchangeably meaning a gamble on predicting the outcome of a predetermined draw or shuffle or alternatively a randomly generated outcome. The term "Random Number Generator" or "RNG" is used in the claims and in the corresponding portions of the specification for brevity, with the term RNG to be understood to mean all forms of random number generation. For example, "True Random Number Generator" or "TRNG," "Pseudo Random Number Generator" or "PRNG" (e.g., Mersenne Twister algorithms, "Linear Congruential Generators" or "LNGs"), etc. could all be referred to as RNGs in this disclosure. Finally, the terms "user," "player," or "consumer" all refer to a human individual utilizing the invention.

Before describing the present invention, it may be useful to first provide a brief description of the concept of authentication as well as the need for authentication in gaming venues, particularly remote (e.g., casino hotel room) gaming locations. The concept is to ensure that a common lexicon is established of existing systems prior to describing the present invention.

The process of authentication is well known in the art of computer sciences, since verifying a user's identity is often required to allow access to confidential data or systems. Typically for gambling embodiments, prior art systems that offer some form of digital wagering and redemption to the betting consumer or user require the consumer to first register with the system, thereby identifying themselves (e.g., Know Your Customer or "KYC") and at the same time establish an account where funds can be stored for future bets and winnings deposited. The authentication process for establishing a gaming KYC account may vary, but typically involves the consumer identifying themselves to the gaming establishment and then receiving an identification card or token thereby linking the consumer to the account.

In some casino environments (e.g., table games, slot machines), authentication requirements may appear to be nonexistent or minimal, but in fact are conducted without the consumers' cognizance. For example, practically every casino abides by laws governing minimum age requirements for gaming and while at a cursory glance there may be no apparent enforcement mechanism, both covert surveillance cameras and "front of house" casino personnel are required to police against underage gambling. Additionally, reverse authentication practices are also commonly conducted by casinos, where covert surveillance cameras continuously scan the consumers in a casino in an attempt to identify any "blacklisted" or "Griffin Book" consumers (e.g., consumers with gambling addictions that register themselves on exclusionary lists, "advantage players," outright cheaters). Additionally, large or jackpot winners are also typically flagged or authenticated at the time of the win to ensure that the actual winner is the individual that cashes out.

In addition to authentication per se, gaming environments are often required to not only acquire authentication data on any consumer requesting access, but also process the acquired authentication data through various government offices or agencies before allowing game play and/or payouts. These government offices or agencies are typically diverse, for example the Internal Revenue Service ("IRS"), the Office of Foreign Assets Control ("OFAC"), and the "Deadbeat Dad Database" are all separate offices or agencies that a gaming establishment must verify authentication data with before allowing play and especially paying out prizes.

Regardless of the embodiment requiring authentication, the ways in which an individual human consumer or user may be authenticated fall into three categories, based on what are known as the factors of authentication: a first factor or level constituting "something the user knows," a second factor level constituting "something the user has," and a third factor or level constituting "something the user is." Each authentication factor covers a range of elements used to authenticate or verify a person's identity prior to being granted access, approving a transaction request, signing a document or other work product, granting authority to others, making a wager, or establishing a chain of authority. Security research has determined that for a positive authentication, elements from at least two, and preferably all three, factors or levels should be verified. The three factors (levels) and some of the elements of each factor are:

1. The knowledge factors: Something the user knows (e.g., a password, partial password, pass phrase, or Personal Identification Number or "PIN"), challenge response (the user must answer a question, or generate a pattern) security question, etc.
2. The ownership factors: Something the user has—e.g., wrist band, identification card, security token, implanted device, cell phone with built-in hardware token, software token, personal computer browser configuration or "fingerprint", cell phone text, etc.
3. The inherence factors: Something the user is or does—e.g., fingerprint, retinal pattern, signature, face, voice, unique bio-electric signals, height, or other biometric identifiers Single factor authentication (i.e., only requiring one of the three factors) is the weakest level of authentication, in single factor authentication only a single component from one of the three categories of factors is used to authenticate an individual user's identity. The use of only one factor authentication does not offer much protection from misuse or malicious intrusion and is typically undesirable for gaming environments. The European Central Bank ("ECB") has defined strong authentication as "a procedure based on two or more of the three authentication factors." The factors that are used must be mutually independent and at least one factor must be "non-reusable and non-replicable," except in the case of an inherence factor and must also be incapable of being stolen off the Internet.

Having concluded the discussion of the prior art authentication in various embodiments, detailed embodiments of the present invention will now be disclosed. As will be apparent to one skilled in the art, the present invention overcomes many of the disadvantages of traditional Class II and Class III gaming environments, particularly enabling easier consumer access with richer immersive virtual reality experiences including greater flexibility in terms of consumer choices, play style, game play, and location.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Figure 1B:
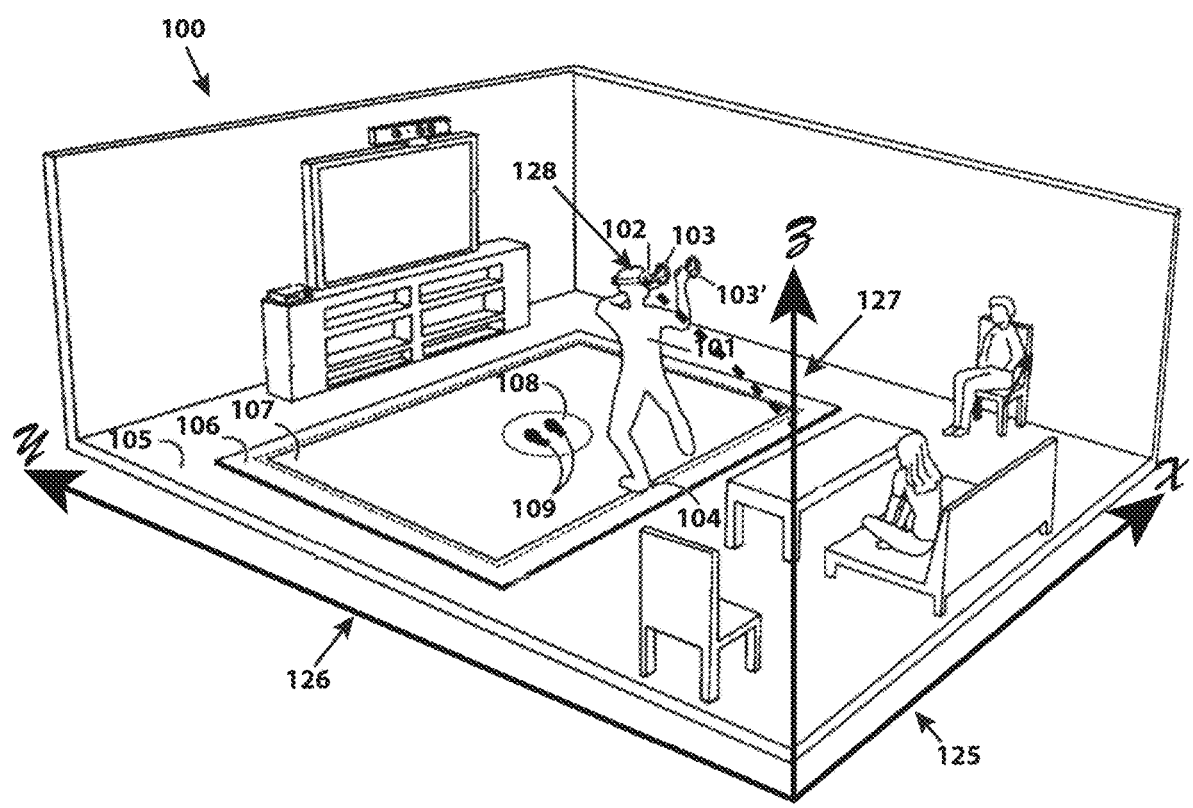
FIG. 1B is a representative example isometric view of the typical VR user device of FIG. 1A garnering room and consumer authentication metrics.

FIGS. 1A and 1B, taken together, illustrate isometrically one general embodiment describing a VR implementation enhancing a traditional predetermined betting venue in a remote area still subjected to jurisdictional control (e.g., casino hotel room, casino kiosk). FIG. 1A illustrates the VR system in general, while FIG. 1B illustrates the same system garnering environmental and consumer authentication metrics. While FIGS. 1A and 1B illustrate a VR embodiment, it is understood that the same fundamental ergonomic interface and system could also be implemented in an AR embodiment with the AR embodiment typically having the advantage of simplified hardware with the disadvantage of a less immersive gaming experience.

In the exemplary system 100 of FIG. 1A the consumer 101 is wearing the VR device 102 (i.e., headgear) thereby experiencing an immersive virtual reality environment while interacting with the virtual reality environment via two hand-held controllers (103 and 103'). In an alternative and preferred embodiment, the consumer 101 interacts with their virtual environment with only hand gestures thereby eliminating the need for controllers (103 and 103'), with this embodiment, the consumer's 101 hand gestures are typically monitored by embedded cameras contained in the VR device 102. Regardless of the method monitoring the consumer's hands or handheld devices, various unique hand gestures or motions may be employed to provide first factor authentication (i.e., level 1, knowledge factors—"something the user knows") where a sequence of hand motions (e.g., making figure eight motions in different directions with each hand, a punch sequence, abbreviated cheerleader routines, football official penalty indication motions, typing a password on a virtual keypad) can essentially function as a password for the virtual environment. In some embodiments, different portions of a previously defined hand motion routine may be employed as a challenge response to the VR device 102. With the alternative and preferred embodiment where the consumer 101 interacts with the virtual environment with only hand gestures (i.e., sans controllers 103 and 103'), the authentication process may be expanded to include third factor authentication (i.e., level 3, inherence factors "something the user is") where the shape and size of the consumer's 101 hands and/or the consumer's height also become authentication metrics.

Returning to the general discussion of the exemplary system 100, the consumer 101 and VR device 102 are necessarily functioning in some real world environment (e.g., casino hotel room, a room in their house, a VR kiosk on a casino floor). where the consumer is standing on a fixed floor 105 that establishes an origin for a $z$-axis relative to the real world environment (i.e., FIG. 1B, callout 127), thereby enabling consumer height measurement (128 of FIG. 1B), which can be utilized as another metric for third factor authentication. Additionally, the VR device 102 typically scans its real world environment, thereby acquiring dimensional metrics of the room space itself on a two-dimensional $x/y$ grid (125 and 126 of FIG. 1B), which can function as an authentication metric of the real world environment itself and/or a metric for second factor authentication (i.e., level 2, ownership factor—"something the user has") in association with the consumer 101. These real world environmental authentication metrics may also be expanded to other environmental metrics e.g., ambient sound, Global Position System (GPS) coordinates, Wi-Fi network identity, Internet Protocol (IP) address.

In addition to providing authentication metrics to the real world environment surrounding, the VR device 102 typically establishes a "safe space" on its calculated $x/y$ grid (125 and 126 of FIG. 1B) in which the consumer 101 may freely move about without fear of bumping into any unseen (i.e., the consumer is visualizing an immersive virtual reality environment and therefore unaware of any real world surroundings) real world obstacles. This safe space typically includes at least two different zones, a free zone 107 where the consumer may move about freely without any warning and a border warning zone 106 where the consumer receives a visual and possibly audible warning if he or she places a foot 104 into the warning zone 106. Since the consumer 101 may typically freely move about the free zone 106 without interference, it is possible to also define at least one authentication area 109 within the free zone 106 where the consumer 101 may provide another first factor (level 1) authentication metric by placing their feet 109 inside the authentication area 108 in response to an authentication challenge from the VR device 102. For example, this type of authentication challenge may be initiated if the consumer elects to pause a gaming session by removing the associated VR equipment (e.g., headgear) and a short time later redonning the same VR equipment, since off-the-shelf VR equipment is typically capable of flagging periods when a consumer 101 removes his or her VR equipment.

Of course, there are other biometrics third factor authentication metrics that can be garnered from the VR device 102 (e.g., eye scans, heart rate, bone conductor transducer) that are well known in the art which can be utilized for game play authentication. However, consumers may be reluctant to allow gaming providers to collect detailed biometric sensitive personal data with the authentication methods previously disclosed. This reluctance to allow collection of biometric authentication data can become particularly problematic when it is realized that biometric authentication data is linked to the individual and most probably unalterable, consequently if biometric authentication data is stolen or hacked its inherent "portability" would infer that any security risk has a much greater possibly of impacting all of the consumer's secure accounts that utilize biometric authentication with the consumer unable to alter the account's authentication data after an account was compromised. In other words, while it can be argued that using a single password across multiple accounts may pose a similar security risk, it is nevertheless the consumer's choice whether to use the same password across multiple accounts and more to the point the password may be changed if compromised while biometric data by its very nature cannot be changed.

Figure 2A:
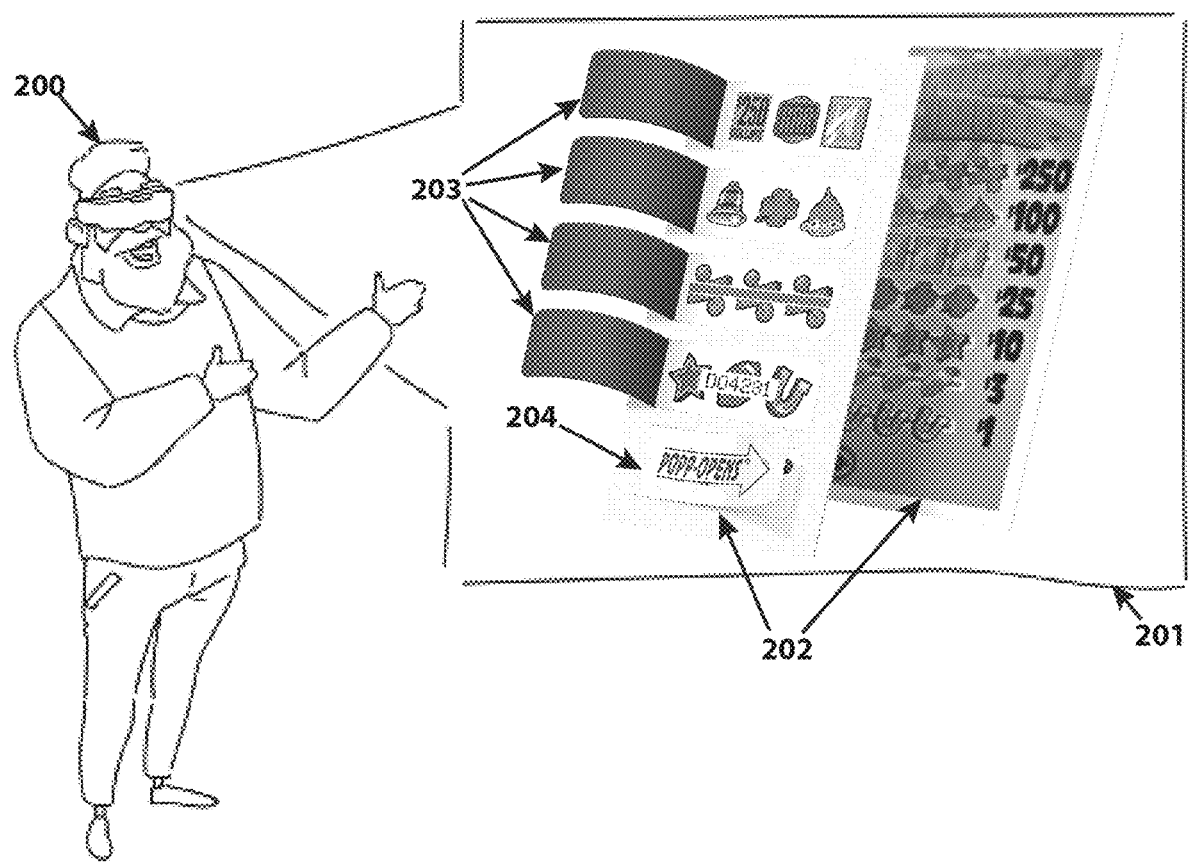
FIG. 2A is a representative example isometric view of the VR user device of FIGS. 1A and 1B displaying the visual environment of a Class II predetermined virtual pull-tab reveal.
Figure 2B:
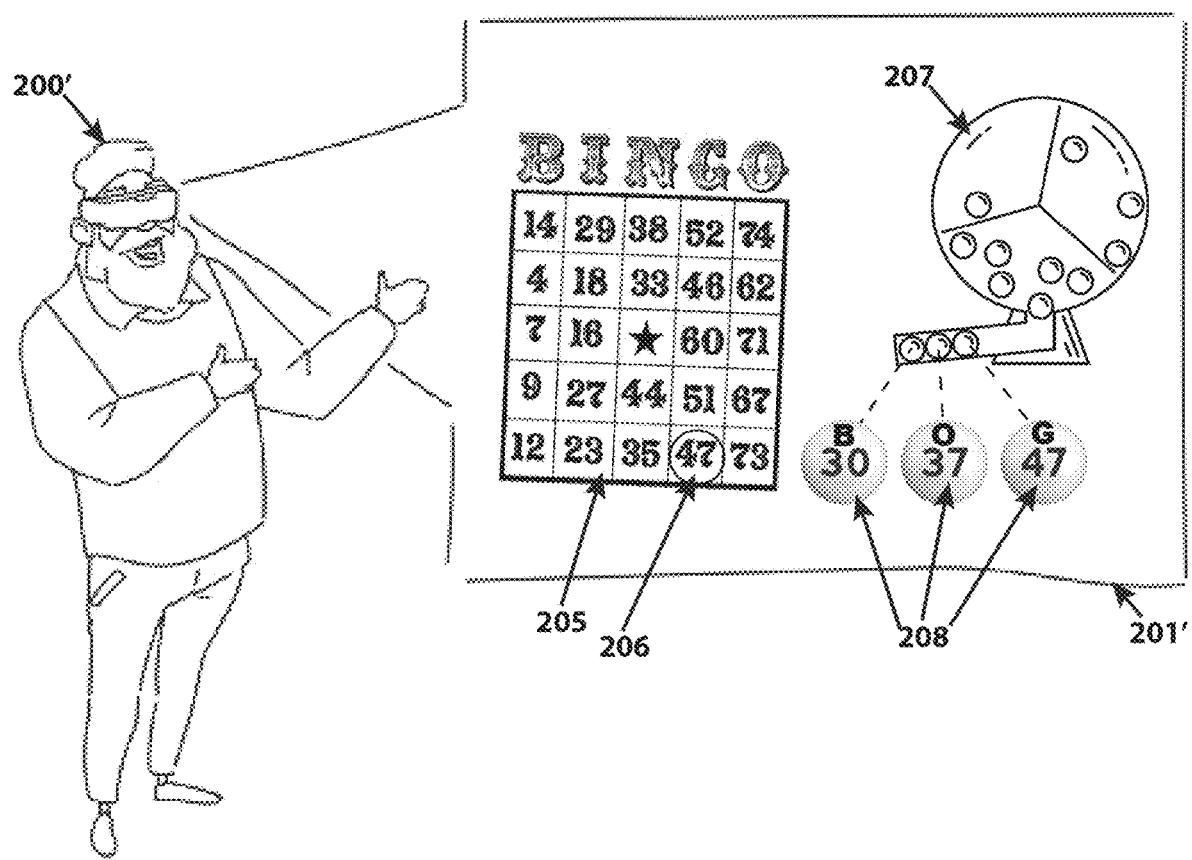
FIG. 2B is a representative example isometric view of the VR user device of FIGS. 1A and 1B displaying the visual environment of a Class II predetermined virtual Bingo game.

The exemplary gaming authentication system 100 of FIGS. 1A and 1B readily adapts itself to Class II or Class III type gaming. Class II gaming typically involves selectively revealing sequential predetermined outcomes (e.g., pull-tab games as shown in FIG. 2A, callout 202) or some form of Bingo (e.g., 205, 207, and 208 of FIG. 2B), which may or may not be predetermined. Typically, Class II gaming can be summarized as a fixed initial wager where the wager's win or lose status is determined by a sequential series of reveals or events. For example, with Class II pull-tab or scratch-off tickets, a consumer 200 (FIG. 2A) in a virtual environment 201 could perceive at least one three-dimensional appearing pull-tab ticket 202 where the sequential series of reveals is graphically displayed by virtually pulling back 203 covering 204 flaps or pull-tabs. In the alternative Class II Bingo example of FIG. 2B, a consumer 200' in a virtual environment 201' may be issued a virtual 5×5 Bingo card 205 with additional animation providing sequential reveals of call number ball selections 207. In the example of FIG. 2B, three call number balls 208 were sequentially revealed resulting in one matching number being flagged 206 on the virtual 5×5 Bingo card 205.

Figure 2C:
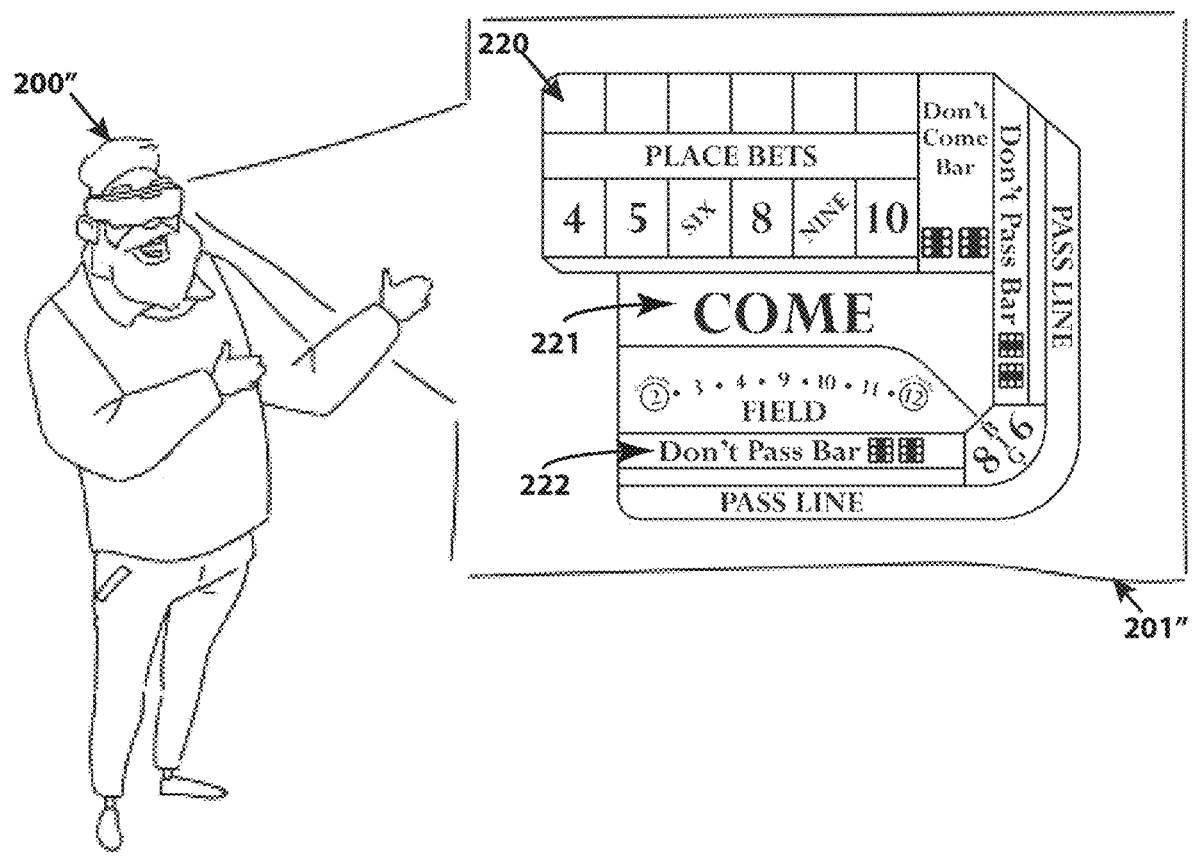
FIG. 2C is a representative example isometric view of the VR user device of FIGS. 1A and 1B displaying the visual environment of a Class III virtual craps game.
Figure 2D:
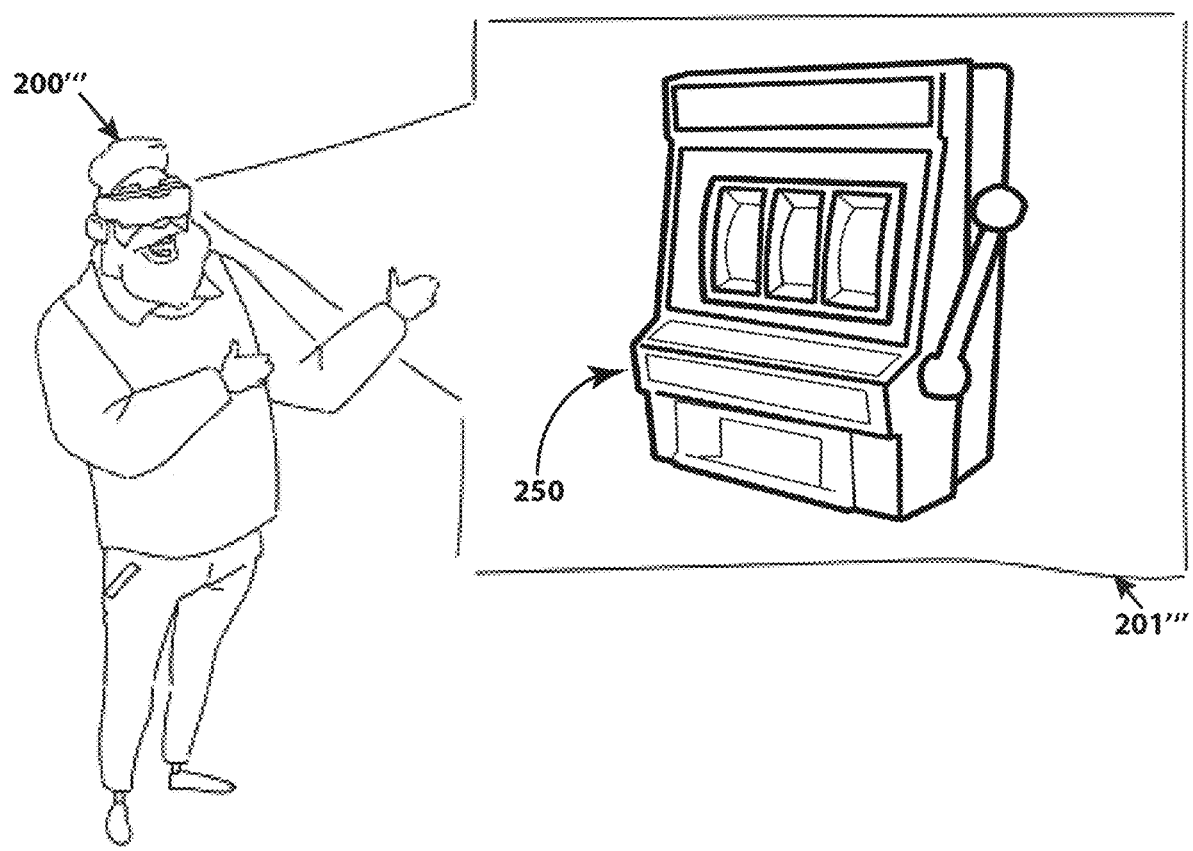
FIG. 2D is a representative example isometric view of the VR user device of FIGS. 1A and 1B displaying the visual environment of a Class III virtual slot machine.

For Class III gaming, the consumer authentication requirements maybe similar; however, the gaming mechanics for Class III will differ. As previously discussed, Class III slot machines typically rely on spontaneous RNG generated outcomes and consequently derive their Expected Value or ("EV") from the law of large numbers. However, as a practical matter, with a sufficient number of plays or "pulls", Class III slot machines typically payout close to their EV. However, other table games (e.g., roulette, craps, blackjack, poker) would also qualify as Class III even when played in a VR environment, again ultimately relying on the law of large numbers to maintain an EV. For example, FIGS. 2C and 2D illustrate two different embodiments (craps 201" and slots 201''') of Class III gaming embodied in VR. In FIG. 2C a virtual craps table 220 appears to a consumer 200" in a VR embodiment 201". In this embodiment the consumer 200" has multiple betting options (e.g., "COME" 221 "Don't Pass Bar" 222) to select by placing virtual chips in the corresponding betting location on the virtual craps table 220. In FIG. 2D a Class III type slot machine 250 is displayed to the consumer 200''' in the VR embodiment 201'''.

In all of these example embodiments, it is the combination of two or three factors (levels) of authentication metrics that when put together enable strong multi-factor consumer or player authentication compliant with Class II or Class III gaming. Ideally, these garnered authentication metrics would not require the acquisition of sensitive and unalterable consumer biometric data. Thus, by incorporating multi-factor strong authentication in gaming applications, the need for detailed level 3 inherence factor authentication data (e.g., eye scans, heart rate, fingerprint, facial recognition, bone conductor transducer) can be greatly reduced or eliminated even in remote VR environments. Likewise, the need for authentication specific hardware (e.g., fingerprint scanner, heart rate monitor) to be added to the standard VR hardware can also be eliminated.

When it is realized that authentication in VR environments is both a critical and a vexing problem, it can be appreciated that providing strong multi-factor consumer or player authentication using non-intrusive methods and off-the-shelf hardware overcomes at least one significant obstacle for commercial viability of VR real money gaming. This is not hyperbole; it is envisioned that most gaming VR environments will be physically remote or at the very least isolated and therefore automated authentication will be essential. Since most real money VR gaming wagers will be billed and prizes will be paid through consumer or player specific digital "wallets", the authentication of the player becomes essential to protect against theft and more to the point ensure that each consumer or user is billed and paid out correctly. While this is true for any real money gaming environment it is particularly true in VR gaming applications since all of the consumer or user's interactions are conducted in a virtual environment isolated from the real world—by design. Thus, in VR types of environments, traditional payable on demand certificates (e.g., TITO or "Ticket-In-Ticket-Out" tickets), player loyalty cards, and/or government issued identification cards (e.g., driver's license, passport) become impractical once the consumer or user is immersed in a virtual environment. Additionally, due partially to remote physical locations typical of VR play as well as synchronization and/or coordination problems it would be problematic to first authenticate a consumer or user through more traditional means and then transfer that authentication to a VR gaming session with the consumer or user later donning VR equipment (e.g., headset). In this example, the possibility of a user different than the authenticated consumer or user participating in the actual VR session due either to error or fraud is easily plausible. Since the actual gaming occurs virtually, there is no guarantee to the gaming establishment that the consumer or user making wagers is the same individual that was initially authenticated if the authentication occurs outside of the virtual environment with the undesirable consequence of potential wallet disputes and associated lawsuits. This is also true if the consumer or user elects to temporarily pause a VR session and resume the same session a short time later—i.e., if the VR equipment was removed by the consumer during the gaming pause at least a new initial authentication process should be reinitiated to ensure authenticity.

The U.S. government's National Information Assurance ("IA") Glossary—i.e., Committee on National Security Systems "National Information Assurance (IA) Glossary" composed from the original on 21 Nov. 2016—defines strong authentication as "layered authentication approach relying on two or more authenticators to establish the identity of an originator or receiver of information" with the European Central Bank ("ECB") defining strong authentication as "a procedure based on two or more of the three authentication factors . . . the factors that are used must be mutually independent and at least one factor must be 'non-reusable and non-replicable', except in the case of an inherence factor and must also be incapable of being stolen off the Internet."

Thus, in all of the previous example embodiments, multi-factor strong authentication in a remote VR gaming environment compatible with Class II and Class III gaming requirements can be achieved by principally garnering data typically collected by off-the-shelf VR devices during normal operations without the need to garner sensitive and non-alterable biometric data. For example, in the system 100 of FIG. 1B the consumer 101 is wearing the VR device 102 (i.e., headgear) while standing on a fixed floor 105 that establishes an origin for a $\mathcal{Z}$-axis 127 relative to the real world environment, thereby enabling consumer height measurement 128 which can be utilized as an inherence factor metric (i.e., "something the user is") for one factor of a multi-factor strong authentication protocol. While it can be appreciated that this height measurement 128 may vary depending on the consumer's orientation (e.g., standing, sitting, crouching, stretching) various height measurement 128 averages developed over short time periods with respect to the consumer's orientation can provide sufficiently stable inherence factor metrics to comply with most authentication requirements. This is not to say that various height measurement 128 averages with respect to the consumer's orientation constitute a sufficient inherence factor metric by itself, but when included as part of a multi-factor authentication strategy can provide surprisingly robust and reliable authentication. Optionally and preferably, these various height measurement 128 averages with respect to the consumer's orientation may be digitally signed by the VR device's asymmetrical private key to further enhance the veracity of the inherence factor authentication metric while also possibly (e.g., addition of cryptographic "salt", time tags) ensuring that the height metric is also "non-reusable and non-replicable" in compliance with the ECB's strong authentication requirements. Of course, as is apparent to one skilled in the art, digitally signing the consumer's height measurement averages 128 by the VR device's private key also provides another level of ownership factor metric ("something the user has"—i.e., the VR device itself) to the multi-factor strong authentication process.

Additionally, in the exemplary system 100 of FIG. 1B. various unique hand gestures or motions may be employed to provide first knowledge factor authentication (i.e., "something the user knows") where a sequence of hand motions (e.g., making figure eight motions in different directions with each hand, a punch sequence, abbreviated cheerleader routines, football official penalty indication motions) can essentially function as a password for the VR environment. In some embodiments, different portions of a previously defined hand motion routine may be employed as a challenge response to the VR device 102. In other embodiments, the size and shape of the consumer's or user's hands may also function as a third factor authentication metric. As before, the first and/or third factor authentication garnered metrics could be optionally digitally signed by the VR device's private key thereby enhancing the garnered metric's veracity and also making it both unique and non-reusable.

Returning to the exemplary discussion of the system 100 of FIG. 1B, the consumer 101 and VR device 102 are necessarily functioning in some real world environment (e.g., casino hotel room, a room in their house, a VR kiosk on a casino floor) where the VR device 102 typically scans its real world environment thereby acquiring dimensional metrics of the room space itself typically on a three-dimensional $\mathcal{X}/\mathcal{Y}/\mathcal{Z}$ grid (125, 126, and 127), which can function as an authentication metric of the real world environment itself as well as a metric for second factor authentication (ownership or "something the user has"—i.e., the room itself) in association with the consumer 101. These real world environmental authentication metrics may also be expanded to other environmental metrics—e.g., ambient sound, GPS coordinates, Wi-Fi network identity and IP address. Of course, this second factor authentication garnered metric could be optionally digitally signed by the VR device's private key thereby enhancing the garnered data's veracity and also making it both unique and non-reusable.

In another example of the system 100 of FIG. 1B the consumer 101 may typically freely move about an established predefined free zone 106 without interference, within this free zone 106 there may also be established at least one authentication area 109 where the consumer 101 may provide another first factor authentication metric (i.e., knowledge factor or "something the user knows") by placing their feet 109 inside the authentication area 108 in response to an authentication challenge from the VR device 102 with the response optionally signed by the VR device's private encryption key. As with all of the previous examples, this first factor authentication example by itself may not provide sufficient authentication security, but when combined with other all or some of the forms of authentication previously disclosed effectively provide multi-factor strong authentication for a remote VR gaming environment.

This is not to infer that VR gaming systems must necessarily authenticate consumer's 101 only at the initial log-in session. Some embodiments relying only on initial authentication can be problematic or even the cause of critical security flaws. To resolve these problems, VR gaming systems should preferably maintain continuous consumer 101 authentication methods that at the very least ensure that the initial login authentication only persists so long as the same consumer 101 continuously wears the same VR device 102 throughout a session. Since most VR off-the-shelf hardware is capable of being cognizant of a consumer 101 wearing the same VR device 102 continuously (e.g., physical position of VR head gear verses hands or handheld controllers, monitoring consumer 101 eye movement, dynamic verses static accelerometer data from the VR head gear or device) it is possible in a VR gaming environment to not burden the consumer 101 with subsequent intrusive authentication prompts during game play unless the game play is interrupted by the consumer 101 removing the VR device 102 even momentarily. In that event, the VR system would initiate a reauthentication process when the VR device 102 is again worn by the consumer 101. However, preferably, if some of the authentication metrics did not change significantly between the pause and resumption of game play (e.g., the real world environment dimensional metrics of the room space itself remains similar, the VR device itself remains the same) the renewed authentication requirements could be reduced (e.g., the consumer 101's height and position and real world environment could be confirmed in a non-obtrusive manner) or eliminated.

In an alternate preferred embodiment, the various multi-factor strong authentication data and optional betting data from each session may be stored preferably encrypted or alternatively in plaintext in a hash chain or blockchain that is maintained by at least the gaming service provider. This preferred hash chain or blockchain embodiment having the advantages of establishing a forensic audit trail as well as providing a historical database that could potentially assist in establishing different multi-factor strong authentication thresholds for each consumer 101. For example, if the consumer's 101 height measurement 128 average(s) for a new login are only within three standard deviations ("$3\sigma$") of the mean average of historical data, stricter tolerances may be required for other real world authentication data (e.g., must also be in a previously authenticated room) than if the consumer's 101 height measurement 128 average(s) are within one or two standard deviations ("$\sigma$" or "$2\sigma$", respectively) of the mean average. Additionally, by optionally encrypting the consumer's 101 authentication and betting data with separate encryption keys in the hash chain or blockchain, a given consumer's 101 historical authentication data may be readily shared between different gaming establishments, thereby increasing the integrity of the authentication data without compromising information concerning how much a given consumer 101 wagered at a particular gaming establishment. Of course, as is apparent to one skilled in the art in view of this disclosure, there are other embodiments that may provide access to historical authentication data that are not necessarily blockchains. For example, a simple two-dimensional database could be constructed with encrypted data that could house a consumer's 101 historical authentication and betting data with the advantage of simplicity and the disadvantages of lower security and inherent difficulties in sharing the authentication data with other gaming establishments.

Figure 3A:
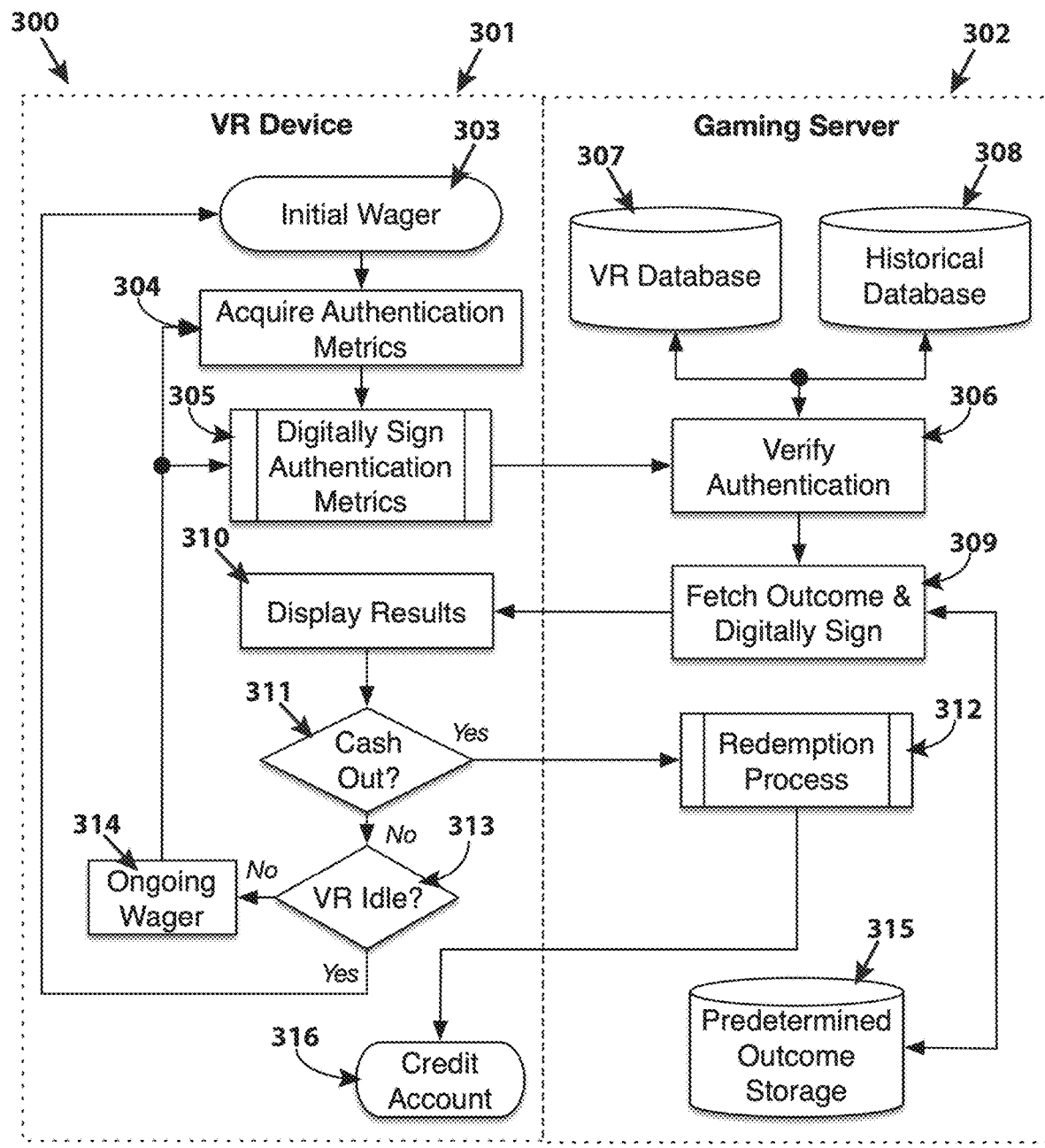
FIG. 3A is an overall swim lane flowchart representative example of the processes associated with displaying and processing the virtual environment of a VR system compatible with the Class II specific embodiments of FIGS. 2A thru 2B.
Figure 3B:
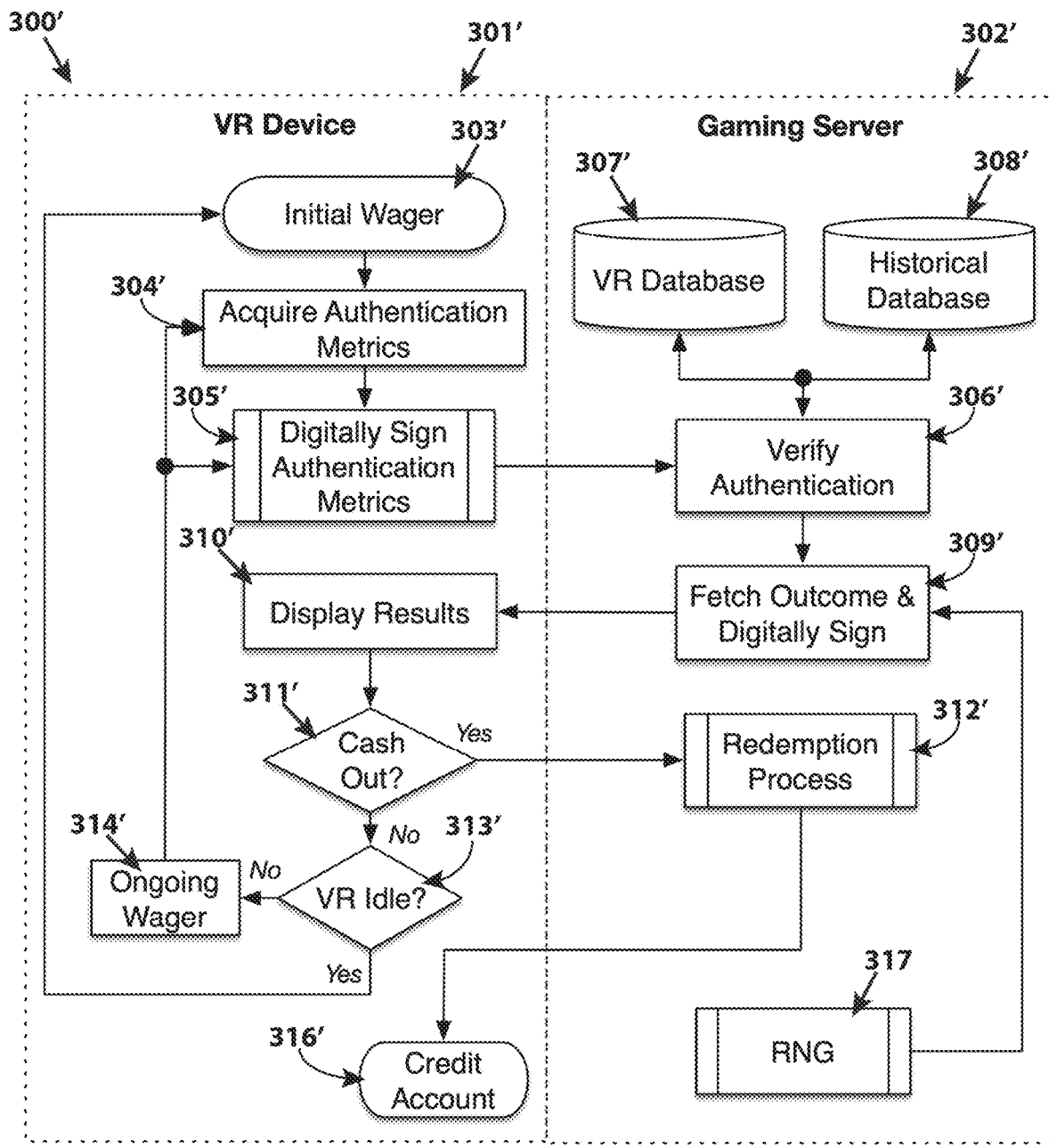
FIG. 3B is an overall swim lane flowchart representative example of the processes associated with displaying and processing the virtual environment of a VR system compatible with the Class III specific embodiments of FIGS. 2C thru 2D.

FIGS. 3A and 3B taken together, provide detailed specific embodiments of the VR authentication systems of Class II and Class III gaming. FIG. 3A illustrates the VR authentication system compatible with Class II gaming with FIG. 3B illustrating the VR authentication system compatible with Class III gaming.

The FIG. 3A swim lane flowchart 300 illustrates the Class II embodiment and is conceptually divided into two groups (i.e., "VR Device" 301 and "Gaming Server" 302) by the two "swim lane" columns as shown. If a particular flowchart function appears completely within a swim lane, its functionality is limited to the device category of the associated swim lane.

The FIG. 3A overall swim lane flowchart 300 begins with the VR Device 301 (e.g., callout 102 of FIGS. 1A and 1B) accepting an Initial Wager 303 (FIG. 3A) and subsequently acquiring a plurality of authentication metrics 304, from a combination of the VR Device 301 itself, the consumer operating the VR Device 301, and the immediate environment surrounding the VR Device 301. These garnered authentication metrics or a portion thereof are then digitally signed 305 by the VR Device 301 using preferably a cryptographic hash (e.g., "Secure Hash Algorithm 256" output—a.k.a. "SHA-256") of the cleartext authentication metrics and optionally other data that is then asymmetrically encrypted into ciphertext of the resulting hash using the VR Device's 301 private key (not shown in FIG. 3A). The ciphertext hash is then appended to the cleartext authentication metrics and optionally other data with the resultant cryptographically digitally signed 305 authentication metrics electronically communicated to the Gaming Server 302.

The Gaming Server 302 receives the digitally signed authentication metrics and then calculates 306 its own cryptographic hash (using a similar hash process that was employed by the VR Device 301) of the received cleartext authentication metrics and optionally other data and then decrypts the appended ciphertext hash using the VR Device's 301 a priori associated public key stored in its VR Database 307 (a.k.a. "Authentication Database"). If the decrypted received hash matches the Gaming Server's 302 calculated hash 306 the VR Device data 301 is authenticated and now qualifies for further detailed authentication analysis. Of course, as is apparent to one skilled in the art, there are other cryptographic techniques for digitally signing or enhancing the security and integrity of the above disclosure. For example, the electronically communicated digitally signed authentication metrics may be further encrypted with a symmetrical encryption algorithm with a shared key between the VR Device 301 and the Gaming Server 302, resulting in additional integrity and confidentiality beyond authentication.

Once the digital signature of the VR Device 301 is verified 306, the Game Server 302 compares the received authentication metrics with the associated data in its Historical Database 308, to determine if the received authentication metrics "correspond" to the historical authentication metrics. Notice that the verb "correspond" was used instead of the phrase "are equivalent" in the previous sentence, this is because any process of garnering consumer or environmental authentication metrics from the real world is inherently susceptible to noise with the resulting garnered authentication metrics most likely being similar to rather than identical to any historical authentication metrics 308. These types of noisy metrics are especially true of the non-intrusive type of authentication metrics previously described in this disclosure—e.g., consumer height, callout 128 of FIG. 1B; room dimensions, callouts 126 and 127 of FIG. 1B. Consequently, in a preferred embodiment, "fuzzy logic" (i.e., a form of many-valued logic in which the truth values of variables may be any real number between zero and one, both inclusive) should be utilized with multiple variables for each metric where the truth values of the totality of variables for a given pair of metrics determines if a garnered authentication metric "correspond" 306 (FIG. 3A) by a machine learning process.

Figure 3C:
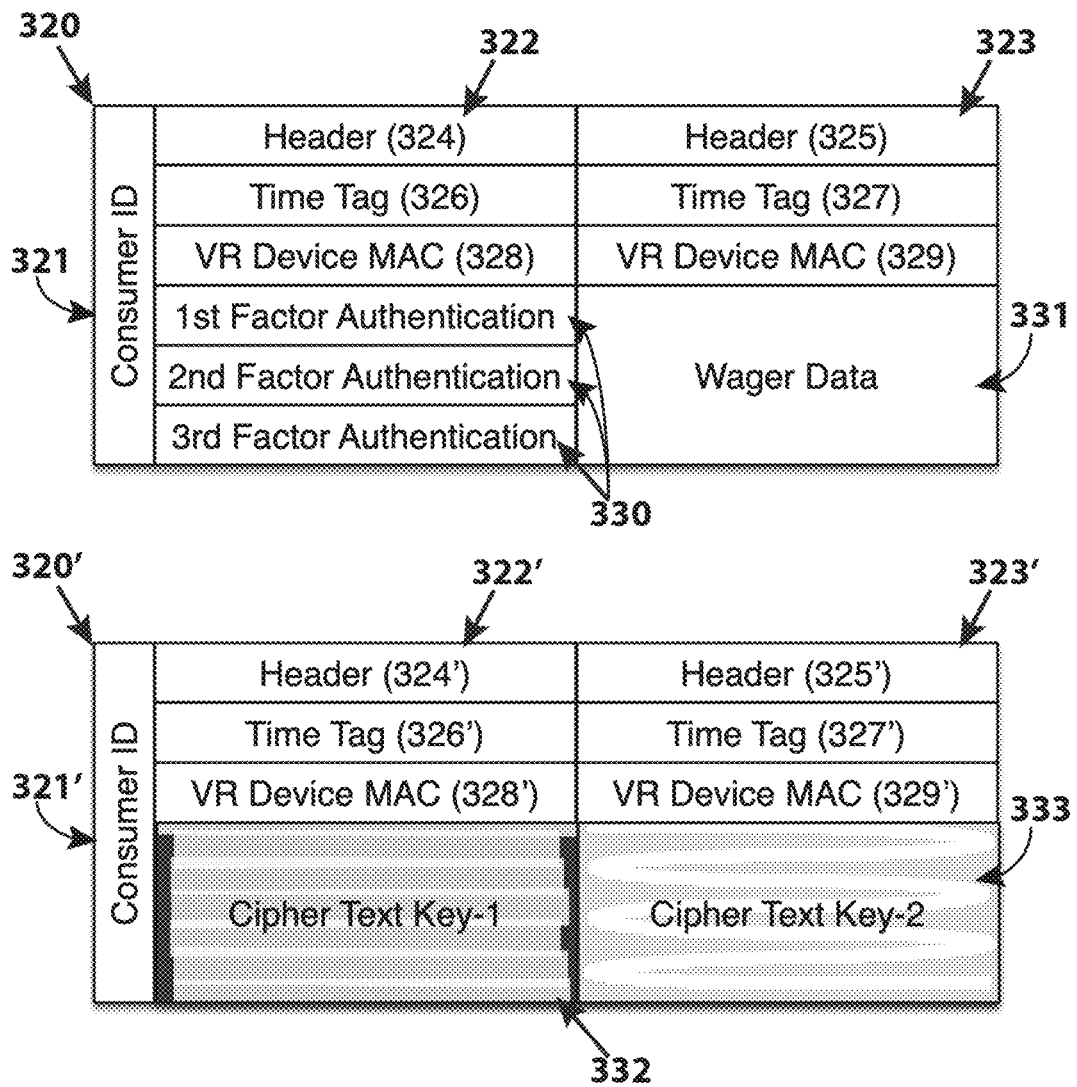
FIG. 3C provides representative examples of two possible structures (plaintext and ciphertext) of a transmitted data block and historical database of FIGS. 3A and 3B.

Regardless of the methodology for determining if the received authentication metrics "correspond" to the Historical Database 308 data, the Historical Database 308 provides a benchmark for authentication validation. If the particular user and VR Device 301 have previously interacted with the VR authentication system 300, the historical metrics will be utilized as a basis for multi-factor strong authentication where historical metrics (e.g., consumer's height average metrics) are used as the standard for authentication (e.g., received consumer's height average metrics and associated postures are within one, two, or three standard deviations—σ, 2σ, or 3σ—of the mean average of the historical data). Additionally, the determination of whether the received authentication metrics "correspond" to the Historical Database 308 data may also vary based on the betting data. For example, if the pending wager is "$1" then a received consumer's height average metrics may "correspond" to the Historical Database 308 data if it is within ±3a, but if the pending wager is "$100" the received consumer's height average metrics would only "correspond" to the Historical Database 308 data if it is within ±σ. In the special case where there is no Historical Database 308 data available for the consumer (i.e., first "Genesis Session", callout 335 of FIG. 3D) at the time of the wager, additional obtrusive authentication data challenges may be required for this first "Genesis Session" (e.g., scanning a consumer identification card, consumer keying in a password on a virtual keypad, verification with an external database that a new consumer has been authorized) that would not be required for subsequent wagers to ensure the legitimacy of the consumer. Irrespective of the pending wager's history (or lack thereof), the pending wager's authentication metrics will always be added to the Historical Database 308 (FIG. 3A), preferably logged via the Consumer's ID 321 (FIG. 3C).

Returning to FIG. 3A, assuming both the digital signature and the authentication metric(s) prove acceptable 306, the Game Server 302 fetches or selects at least one predetermined outcome 309 from its pool of a plurality of predetermined outcomes 315 typically stored in a separate database. In this Class II embodiment, this fetching process simply selects the next predetermined outcome in the series. However, in a preferred embodiment, each sequential predetermined outcome is selected via a Random Number Generator ("RNG") or PseudoRandom Number Generator ("PRNG"), such that the next predetermined outcome cannot be derived from the previous. The preferred embodiment having the advantage of added security against possible insider fraud. Regardless of the method of predetermined outcome selection, the fetched at least one predetermined outcome is optionally and preferably digitally signed 309 by the Game Server 302 (using a similar process to the previously disclosed VR Device 301 signature) and then electronically communicated to the VR Device 301.

The VR Device 301 then receives the at least one predetermined outcome and optionally verifies the Game Server's 302 digital signature. Assuming the optional digital signature verifies, the at least one predetermined outcome is correspondingly displayed 310 on the VR Device 301, in immersive virtual reality. This process is repeated for each of the at least one predetermined outcome requests until the consumer quits or cashes out any winnings 311. In the event the consumer elects to cash out 311, the VR Device 301 typically transfers the cash out request to the Gaming Server 302 where a Redemption Process 312 ensues resulting in the winnings being credited to the consumer's account 316. Otherwise, if the consumer elects to continue play 311, a second process 313 will determine if the VR Device 301 was idle between wagers—i.e., the consumer removed the VR device 301 for whatever reason. If the VR device 301 was not idle then the subsequent wager is simply an Ongoing Wager 314 with the Ongoing Wager 314 preferably processed with minimal (i.e., non-obtrusive) multi-factor authentication metrics (e.g., consumer's height, VR Device's 301 Media Access Control or "Mac" address, VR Device's 301 digital signature, environmental or room metrics) that do not disrupt the consumer's game play. However, if the VR device 301 was determined to be idle 313 between wagers, additional (more intrusive) authentication metrics may be required—e.g., the consumer is challenged to place their feet 109 (FIGS. 1A and 1B) inside an authentication area 108. Though, as before, the determination threshold of whether additional authentication metrics are required may also vary depending on the value of the pending wager.

The FIG. 3B swim lane flowchart 300' illustrates the Class III embodiment and is conceptually divided into two groups (i.e., "VR Device" 301' and "Gaming Server" 302') by the two "swim lane" columns as shown. The FIG. 3B overall swim lane flowchart 300' embodiment of a Class III gaming system is almost identical to the FIG. 3A Class II embodiment with the exception that the Predetermined Outcome Storage database 315 (FIG. 3A) is substituted in FIG. 3B for a RNG 317.

As before, the FIG. 3B swim lane begins with the VR Device 301' accepting an Initial Wager 303' and subsequently acquiring a plurality of authentication metrics 304', from a combination of the VR Device 301' itself, the consumer operating the VR Device 301', and the immediate environment surrounding the VR Device. 301' These garnered authentication metrics or a portion thereof are then digitally signed 305' by the VR Device 301' preferably using a cryptographic hash of the cleartext authentication metrics and optionally other data that is then asymmetrically encrypted into ciphertext by the VR Device's 301 private key. The ciphertext hash is then appended to the cleartext authentication metrics with the resultant cryptographically digitally signed 305' authentication metrics electronically communicated to the Gaming Server 302'.

The Gaming Server 302' receives the digitally signed authentication metrics and then calculates 306' its own cryptographic hash of the received cleartext authentication metrics and optionally other data and then decrypts the appended ciphertext hash using the VR Device's 301' a priori associated public key stored in its VR Database 307'. If the decrypted received hash matches the Gaming Server's 302' calculated hash 306' the VR Device data 301' is validated and now qualifies for detailed authentication analysis.

Once the digital signature of the VR Device 301' is verified 306', the Game Server 302' compares the received authentication metrics with the associated data in its Historical Database 308', to determine if the received authentication metrics "correspond" to the historical authentication metrics. Assuming both the digital signature and the authentication metric(s) prove acceptable 306', the Game Server 302' queries the RNG 317 for at least one gaming outcome. The VR Device 301' then receives the at least one outcome from the RNG 317 and optionally verifies the Game Server's 302' digital signature. The at least one predetermined outcome is correspondingly displayed 310' on the VR Device 301', in immersive virtual reality. This process is repeated for each at least one predetermined outcome request until the consumer quits or cashes out any winnings 311'. In the event the consumer elects to cash out 311', the VR Device 301' typically transfers the cash out request to the Gaming Server 302' where a Redemption Process 312' ensues resulting in the winnings being credited to the consumer's account 316'. Otherwise, if the consumer elects to continue play 311', a second process 313' determines if the VR Device 301' was idle between wagers. If the VR device 301' was not idle, then the subsequent wager is simply an Ongoing Wager 314' with the Ongoing Wager 314' processed with minimal preferably non-obtrusive multi-factor authentication metrics that do not disrupt the consumer's game play. However, if the VR device 301' was determined to be idle 313' between wagers, additional, more intrusive, authentication metrics may be required—e.g., the consumer is challenged to place their feet 109 (FIGS. 1A and 1B) inside an authentication area 108.

FIG. 3C provides two representative examples of possible structures (plaintext 320 and ciphertext 320') for the transmitted data and historical database of FIGS. 3A and 3B. As shown in FIG. 3C, the exemplary plaintext 320 historical database structure supports the logging of a plurality of the three factors of authentication metrics 330 for each wager 331 made in the VR environment. Additionally, the recorded authentication metrics 330 and wager 331 data are primarily sorted by the Consumer ID 321 of the consumer or user operating the VR device at the time the wager was made. The database structure 320 is also arranged such that the authentication and wager data are partitioned in their own discrete columns or silos (322 and 323, respectively) with different separate, but related Headers 324 and 325 automatically generated by the VR device for each column (322 and 323) thereby enabling identification of each set of authentication 330 and wager 331 data (in the context of this disclosure the term "each set" refers to the set of authentication metrics supplied for the three factors of authentication for a given pending wager—i.e., each factor may include zero, one, or a plurality of discrete authentication metrics for the pending wager). Finally, redundant Time Tags (326 and 327) and VR Device Mac addresses (328 and 329) are provided in each column (322 and 323) enabling the option of separate and discrete authentication 322 or wager 323 historical database or combined searches.

Thus, the database structure 320 readily enables access to historical authentication and/or wagering by user (consumer), by VR device, by session, and/or time. By separating authentication data from wagering data in separate columns or silos with related Headers (324 and 325) it is possible to supply access to historical authentication data 330 to one or more gaming operators without sharing a given consumer's wagering history 331. Conversely, by providing the option of linking wagering data 331 to authentication data 330 it becomes possible to implement dynamic minimum authentication thresholds where the minimal acceptable authentication threshold can vary depending on the size of the wager (e.g., minimum of two factor authentication for $1 wagers and a minimum of three factor authentication for wagers $50 and higher, tighter standard deviation tolerances to the mean average for higher wagers, etc.) as well as provide a wagering history for an authorized game service provider to determine if a pending wager "corresponds" to a normal pattern for any given consumer, possibly increasing minimum authentication thresholds if a pending wager deviates significantly from historical data. Also, if the gaming service provider wishes to run generic reports on consumer's wagering habits the wagering data can be readily acquired without any danger of compromising personal consumer authentication information, particularly if biometric data or an identification card (e.g., driver's license) were utilized as a portion of the authentication data.

This isolation of the authentication 322 and wager 323 columns or silos can be further extended with the optional ciphertext embodiment 320'. As shown in FIG. 3C, the optional ciphertext embodiment 320' would maintain the same fundamental database structure of isolated columns or silos for the authentication 322' and wagering 323' data as before with the authentication data also being encrypted using one symmetrical encryption key 332 and the wagering data being encrypted with a separate symmetrical encryption key 333. However, in the optional encrypted embodiment 320' the remaining portions of the database structure (i.e., Consumer ID 321', Headers 324' and 325', Time Tags 326' and 327', and VR Device MAC 328' and 329') would remain in cleartext to assist in database maintenance and general generic reports (e.g., the number of wagers made over a predefined time period). By encrypting the authentication 322' and wagering 323' portions with different encryption keys, the entire historical database can be readily shared across different gaming platforms and/or gaming service providers without potentially compromising sensitive wagering 323' or authentication 322' data to nefarious and/or unauthorized personnel.

Finally, by arranging both the plaintext 320 and ciphertext 320' structures with common and related cleartext data references (i.e., Consumer ID 321', Headers 324' and 325', Time Tags 326' and 327', and VR Device MAC 328' and 329') across different columns or silos ancillary information is readily available. For example, the Headers (324, 325, 324' and 325') could include a bit to indicate whether a pending wager is a continuation of an "ongoing" session or an "initial" authentication after the previous session was paused.

Figure 3D:
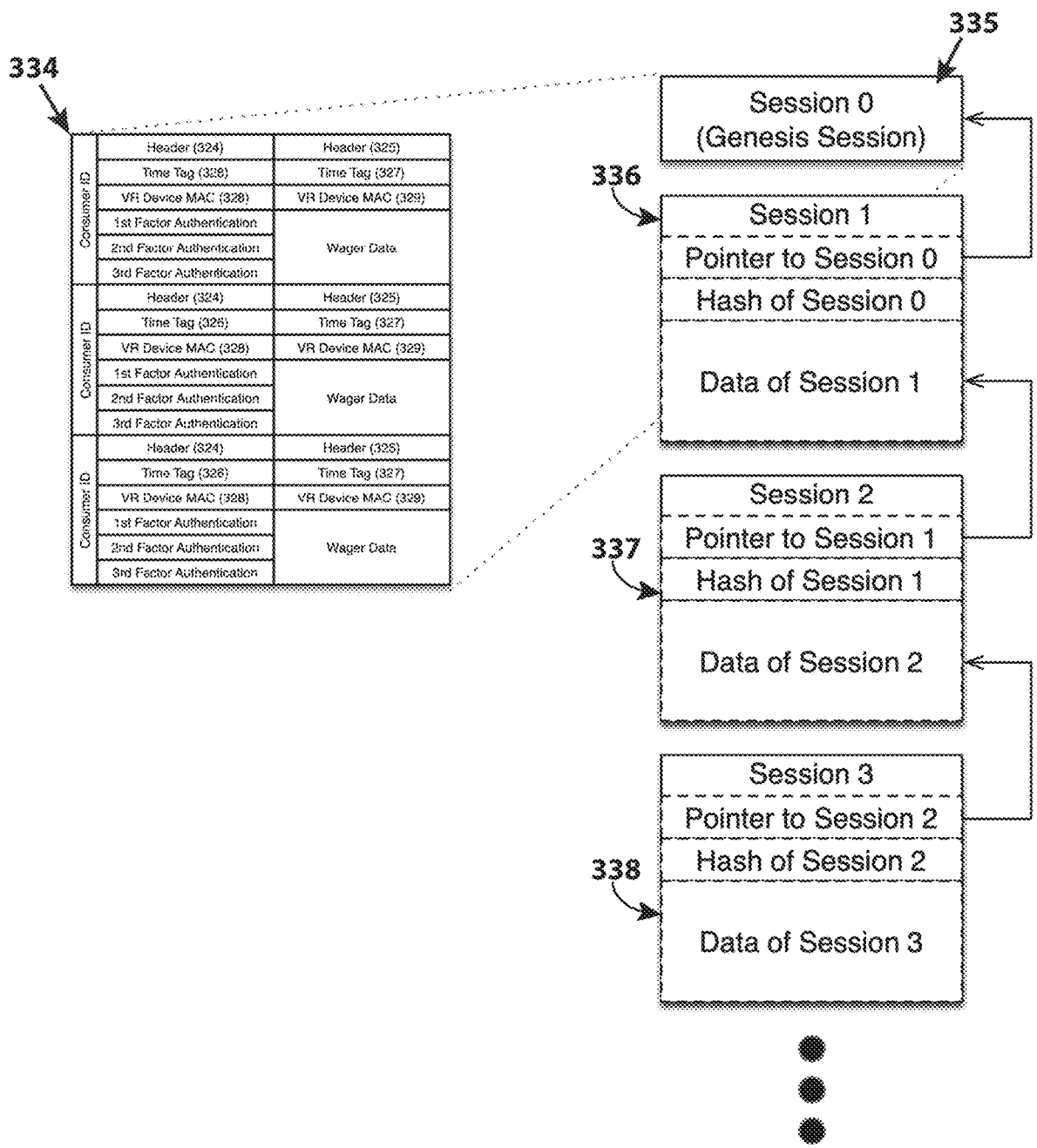
FIG. 3D is a representative example of a possible structure of a blockchain embodiment of the historical database of FIGS. 3A and 3B.

This same fundamental database structure (320 and 320') may be optionally linked as part of a hash chain or blockchain as illustrated in FIG. 3D. In the example of FIG. 3D, the session 334 is comprised of three different wagers and authentications (each shown magnified as callout 320 of FIG. 3C) may be optionally saved into a hash chain 335 (FIG. 3D) with the very first (root) session for a given consumer and/or VR device becoming "Session 0" or the "Genesis Session." The next subsequent session 336 would include a pointer to the previous (Genesis Session) as well as a cryptographic hash (e.g., SHA-256) of the previous session 335 in the hash chain as well as its own session data. This hash chain process will continue as subsequent sessions (337 and 338) occur for the same consumer and/or VR device with each session essentially linked to all previous sessions in a manner that no historical data may be altered without disturbing the integrity of the hash chain. Thus, by maintaining the disclosed database structure in a hash chain its historical integrity is assured and becomes therefore suitable for forensic audits of the high integrity typically required of the gambling or gaming industry.

Of course, the hash chain of FIG. 3D is only one possible embodiment with other embodiments being conceivably more desirable under some circumstances. For example, the individual hash chain depicted in FIG. 3D may be extended or replaced by an overall blockchain of all VR gaming sessions for a given gaming establishment, thereby enabling a broader distribution of the data—i.e., the term "blockchain" differing from the term "hash chain" in that a blockchain is generally intended to support distributed consensus around a ledger shared across multiple entities where a hash chain is typically creating links through a plurality of nodes maintained by a single entity. In this example where the historical session data becomes a part of an overall blockchain, the previously disclosed encrypting of portions of the data (callout 320' of FIG. 3C) different entities could optionally restrict access to different portions of a historical database that is shared among multiple gaming providers.

Figure 3E:
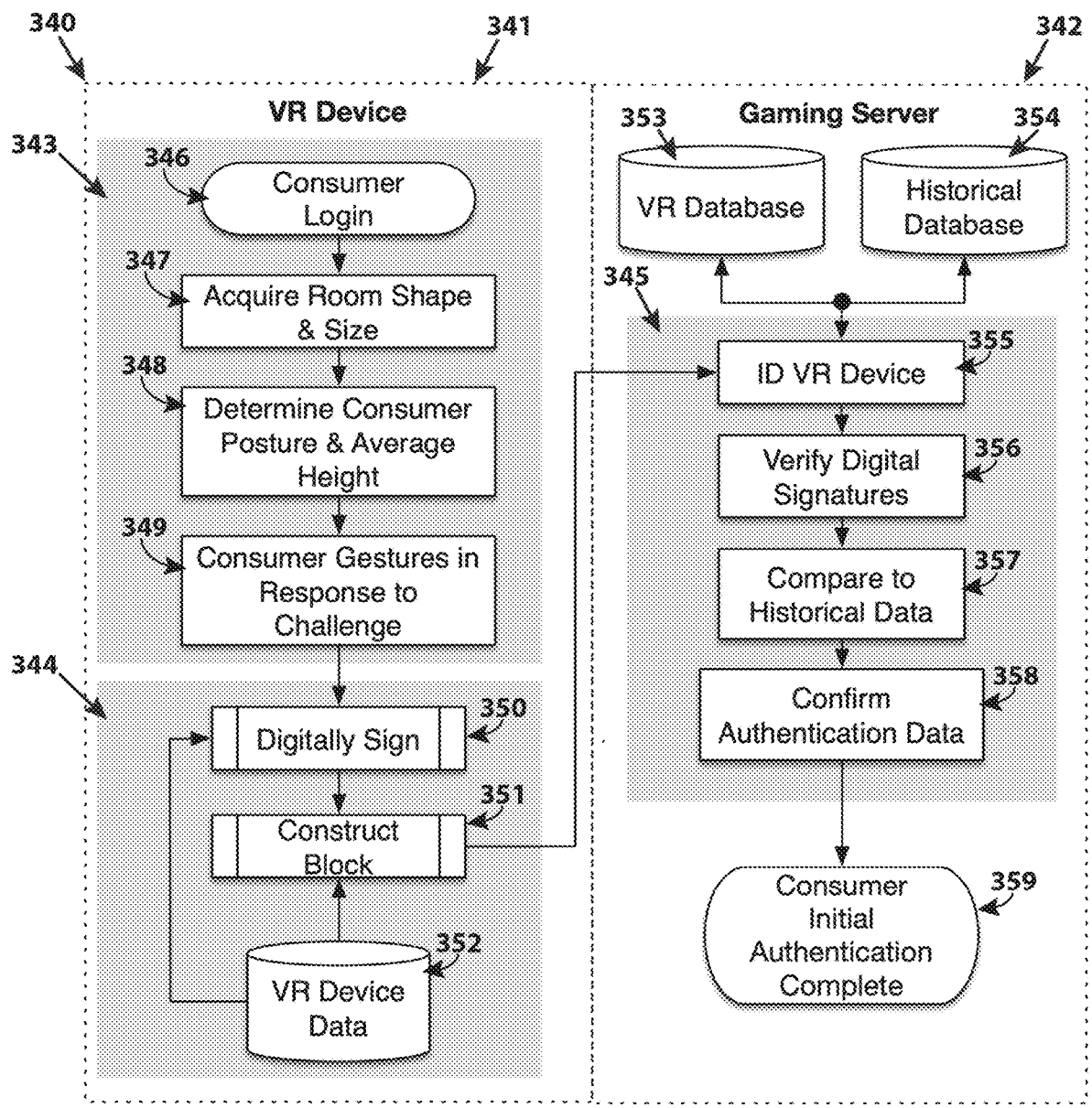
FIG. 3E is an overall swim lane flowchart representative example of an initial strong multi-level authentication process compatible with FIGS. 3A and 3B.
Figure 3F:
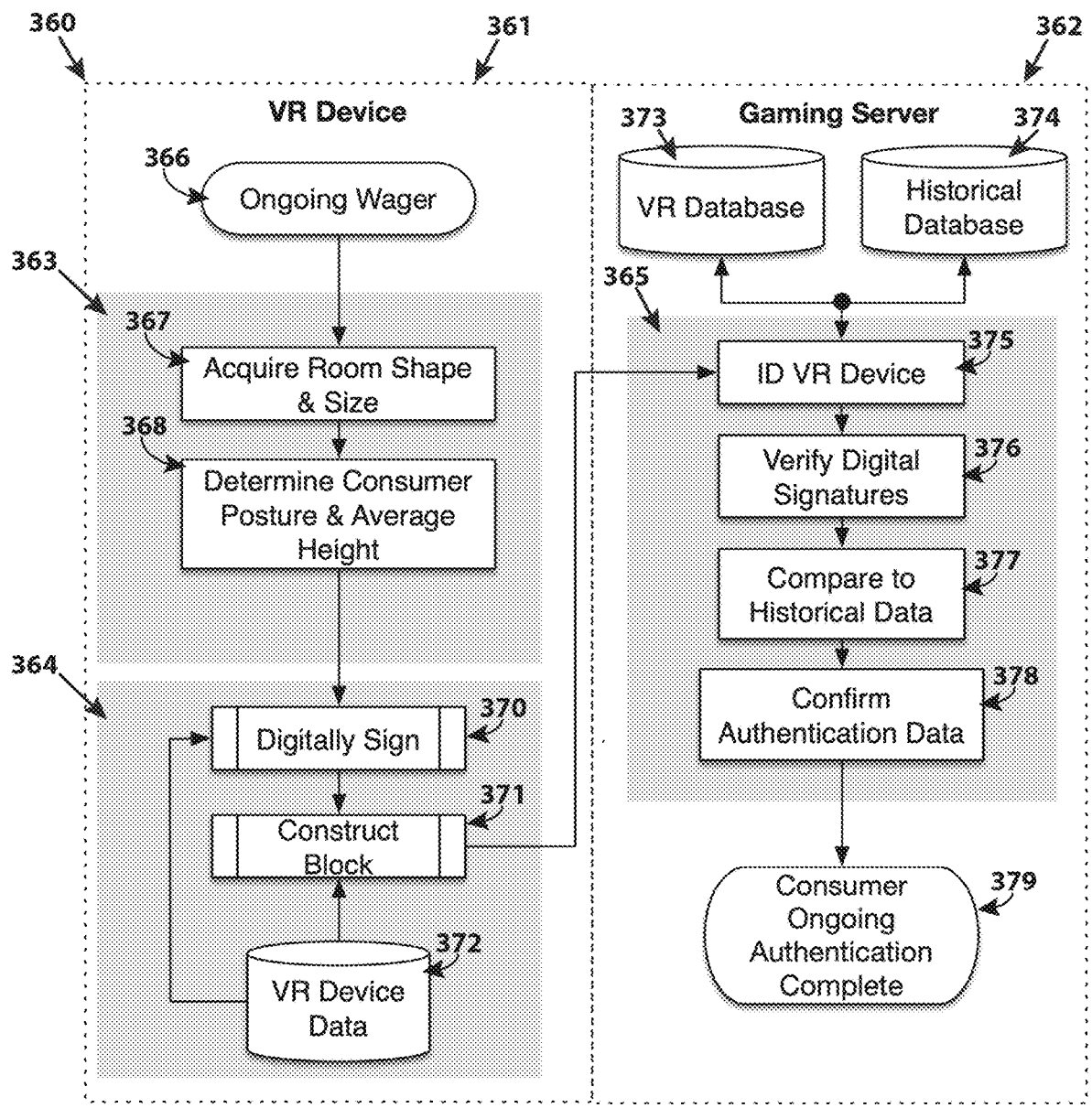
FIG. 3F is an overall swim lane flowchart representative example of an ongoing strong multi-level authentication process compatible with FIGS. 3A and 3B.

FIGS. 3E and 3F taken together, provide detailed specific embodiments of the VR authentication systems for both initial and ongoing strong multi-level authentication processes compatible with the Class II gaming system of FIG. 3A and the Class III gaming system of FIG. 3B. FIG. 3E illustrates an exemplary VR authentication system for an "initial" gaming wager 340 and FIG. 3F illustrates an exemplary VR authentication system for an "ongoing" gaming wager 360. Similar to FIGS. 3A and 3B, both FIGS. 3E and 3F are presented as swim lane flowcharts 340 and 360 divided into two groups (i.e., "VR Device" 341/361 and "Gaming Server" 342/362) by the two "swim lane" columns as shown. If a particular flowchart function appears completely within a swim lane, its functionality is limited to the device category of the associated swim lane. Additionally, the three separate shaded areas of FIGS. 3E and 3F (343/363, 344/364, and 345/365) highlight the FIGS. 3A and 3B processes associated with the Acquire Authentication Metrics 304/304' (shown as callouts 343 and 363 in FIGS. 3E and 3F, respectively), Digitally Sign Authentication Metrics 305/305' (shown as callouts 344 and 364 in FIGS. 3E and 3F, respectively), and Verify Authentication 306/306' (shown as callouts 345 and 365 in FIGS. 3E and 3F, respectively).

The initial strong multi-level authentication process 340 of FIG. 3E begins with the Consumer Login 346 where the consumer first identifies himself or herself to the authentication system that comprises the first and/or second level of authentication. In various embodiments this may comprise the consumer entering an username and password into a virtual keyboard, verbally saying an identifying word or phrase, showing the VR Device 341 an identification card, performing specific hand motions, using an already authenticated personal VR Device 341, etc. The significant point being that the consumer enables the system to recognize his or her individual Consumer ID 321/321' (FIG. 3C) such that the authentication system can uniquely identify the consumer and retrieve any available historical authentication data 308/308' (FIGS. 3A and 3B). Once the consumer's identity is established via a successful Consumer Login 346 (FIG. 3E), the consumer's VR Device 341 typically analyzes its immediate environmental surroundings 347 garnering a geometrical description of its environment (e.g., room length, width, and height) and other environmental ancillary data (e.g., Wi-Fi network, IP address) as second level authentication data. Next, the VR Device 341 typically provides an analysis of the consumer's height relative to his or her physical position 348 as a third level authentication metric. In this example, this height authentication data is ideally sampled over multiple trials and when possible over multiple positions, thereby providing overall average height metrics rather than one simple measurement. Finally, in this example embodiment for an initial authentication, the consumer maybe obtrusively challenged to respond with a gesture or position himself or herself inside an authentication area 108 (FIGS. 1A and 1B) in a level one response to an authentication challenge from the VR Device 341 (FIG. 3E).

Regardless of the exact authentication metrics garnered in this initial acquire functionality 343, once the authentication metrics are acquired the system advances to digitally signing and transmitting 344 the acquired authentication metrics to the Game Server 342. This Digitally Signing process 350 typically includes performing a secure cryptographic hash (e.g., SHA-256) of at least the authentication data to be transmitted, retrieving the VR Device's 341 private asymmetrical encryption key from its secure memory 352, and asymmetrically encrypting the resultant cryptographic hash with its retrieved private key. Additionally, at this point in the process, other VR Device Data 352 is retrieved (e.g., VR Device Mac 328/328' and 329/329', Time Tag 326/326' and 327/327', and/or the Consumer ID all of FIG. 3C) also typically including at least a status bit to indicate whether this data represents an initial or subsequent (ongoing) session authentication as well as some form of synchronization number to uniquely identify this authentication. Irrespective of the data garnered, the plurality of authentication metrics and the other VR Device Data 352 (FIG. 3E) retrieved is constructed into a data block 351 typically similar in architecture to the data blocks 320/320' disclosed in FIG. 3C with the digital signature, synchronization number, and initial/ongoing flag bit typically embedded in the Header (327/324' and 325/325').

Returning to FIG. 3E, at this point the Constructed Block 351 is transmitted from the VR Device 341 to the Gaming Server 342 where it is received by the verify authentication function 345. The first process in the verify authentication function 345 extracts the VR Device ID 355 as well as the Consumer ID (321/321' of FIG. 3C) and uses this information to look up the VR Device 341 (FIG. 3E) and its associated public asymmetrical decryption key as well as confirm the Consumer ID from the VR Database 353. Additionally, the ID VR Device process 355 preferably checks to determine if the received Consumer ID and VR Device 341 have been previously used together and if so, adds this conclusion as an extra second level authentication metric. On the other hand, if the conclusion is the Consumer ID and VR Device 341 have not been previously utilized together, the authentication process will continue with possibly another obtrusive authentication challenge requested of the consumer (e.g., specific hand motions, positioning feet within a designated area as shown by callouts 109 and 108 respectively of FIG. 1B), possibly depending on other criteria (e.g., the size of the pending wager).

Next, the digital signature typically embedded in the header of the received block is verified 356 by typically performing an identical secure cryptographic hash (e.g., SHA-256) of at least the authentication data that was transmitted to the Gaming Server 342 and then retrieving the VR Device's 341 public asymmetrical encryption key from the VR Database 353. The received digital signature is then decrypted using the retrieved VR Device's 341 public key with the resulting received cleartext secure cryptographic hash is compared to the calculated hash. It should be noted that the secure cryptographic hash is calculated on the data as received, so that if a portion of the received block data is ciphertext the ciphertext itself would be utilized at least in part to calculate the cryptographic hash. Assuming the received and calculated cryptographic hashes are identical, the digital signature is verified 356 and the authentication function 345 proceeds to the Compare to Historical Data 357 process. Otherwise, an error condition has occurred with some sort of remedial action required (e.g., retransmission of the block, reinitiating the entire authentication process) before the authentication process can continue.

Upon successful verification of the received digital signature 356, the authentication portion of the received block (330/330' of FIG. 3C) is, if required, optionally deciphered and with the received cleartext authentication metrics compared to corresponding historical authentication metrics 357 (FIG. 3E) stored in the Historical Database 354 for the same consumer and/or VR device 341. The comparison processes may vary depending on the type or nature of the received authentication metrics. For example, received third inheritance factor metrics (e.g., height and posture, hand size and shape) may be compared to determine if the received metrics are within the mean average plus or minus one, two, or three standard deviations (σ, 2σ, or 3σ) from the mean of the metrics garnered from the Historical Database 354. Likewise, in other examples, environmental (e.g., room size and shape) second ownership factors as well as first knowledge factors (e.g., hand motions, feet placement) may also be compared to determine if the received metrics are within σ, 2σ, or 3σ of the data from the mean average of metrics garnered from the Historical Database 354. However, some other types of authentication metrics (e.g., first factor passwords, second factor VR Device 341 Mac address and Wi-Fi addresses, third factor fingerprints) may only accommodate a direct equivalent comparison. Optionally and preferably, the received Wager Data (callouts 331 and 333 of FIG. 3C) may be (optionally decrypted) and also compared to historical wager data also maintained in the Historical Database 354 (FIG. 3E). Of course, including received wager data has the advantages of typically more accurate authentication and consequently higher security with the disadvantage of possibly sharing sensitive wager data to unauthorized or undesirable (e.g., competitive game service provider) personnel.

Finally, once the historical authentication data has been garnered and compared to the received authentication data 357, the Confirm Authentication Data 358 process begins ultimately terminating in a "yes" or "no" decision of whether the consumer and associated VR Device 341 have been acceptably authenticated or not. This is a relatively straightforward process 358 that reviews the historical data comparisons and tallies the results from each of the various validation metrics applying a priori rules that may or may not be consumer or device unique. For example, successful two factor authentication may be sufficient if there is a sufficiently long history of acceptable transactions for a given consumer and/or VR Device 341; conversely, if the historical data for a given consumer and/or VR Device 341 is sparse, successful three factor authentication may be mandated before the consumer and/or VR Device 341 is considered authenticated for a pending wager. As before, optionally and preferably, the Confirm Authentication Data 358 process' utility may be greatly enhanced by including both the present pending wager and optionally the historical wager data in the decision making process with the same advantages and disadvantages as previously disclosed. Regardless of the exact logic and rules implemented by the Confirm Authentication Data 358 process, when the process concludes that the consumer and associated VR Device 341 have been acceptably authenticated, the process terminates, and the pending wager and associated game play is allowed to continue 359 unabated.

While FIG. 3E disclosed initial strong multi-level authentication process 340 embodiments, FIG. 3F discloses strong multi-level authentication process 360 embodiments for ongoing wagers. FIG. 3F begins with the consumer electing to make an additional wager 366 as part of an ongoing session where the system is already cognizant of the individual Consumer ID 321/321' (FIG. 3C) and associated VR Device 361 (FIG. 3F). Thus, the acquire authentication metrics function 363 begins with the consumer's VR Device 361 typically analyzing its immediate environmental surroundings 367 garnering a geometrical description of its environment and other environmental ancillary data as non-obtrusive second level authentication data. Next, the VR Device 361 typically provides an analysis of the consumer's height relative to his or her physical position 368 as a non-obtrusive third level authentication metric. In this example, this height authentication data is ideally sampled over multiple trials from the same session and when possible, over multiple positions. Ideally, in this example embodiment for an ongoing authentication, the consumer should preferably not be presented with any obtrusive challenges (e.g., asked to respond with a gesture, position himself or herself inside an authentication area, enter or say a password or pin) unless negative feedback from the Gaming Sever 362 demands it.

Once the authentication metrics are acquired, the system advances to digitally signing and transmitting 364 the acquired authentication metrics to the Game Server 362. This Digitally Signing process 370 typically includes performing a secure cryptographic hash of at least the authentication data to be transmitted, retrieving the VR Device's 361 private asymmetrical encryption key from its secure memory 372, and asymmetrically encrypting the resultant cryptographic hash with its retrieved private key. Additionally, at this point in the process, other VR Device Data 372 is retrieved typically including at least a status bit to indicate whether this data represents an initial or subsequent (ongoing) session authentication as well as some form of synchronization number to uniquely identify this authentication. The plurality of garnered authentication metrics and the other VR Device Data 372 retrieved is constructed into a data block 371 with the digital signature, synchronization number, and initial/ongoing flag bit typically embedded in the Header.

At this point the Constructed Block 371 is transmitted from the VR Device 361 to the Gaming Server 362 where it is received by the verify authentication function 365. The first process in the verify authentication function 365 extracts the VR Device ID 375 as well as the Consumer ID and uses this information to look up the VR Device 361 and its associated public asymmetrical decryption key as well as confirm the Consumer ID from the VR Database 373. Additionally, the ID VR Device process 375 preferably checks to determine if the received Consumer ID and VR Device 361 have been previously used together and if so, adds this conclusion as an extra second level authentication metric.

Next, the digital signature typically embedded in the header of the received block is verified 376 by typically performing an identical secure cryptographic hash of at least the authentication data that was transmitted to the Gaming Server 362 and then retrieving the VR Device's 361 public asymmetrical encryption key from the VR Database 373. The received digital signature is then decrypted using the retrieved VR Device's 361 public key with the resulting received cleartext cryptographic hash compared to the calculated hash. Assuming the received and calculated cryptographic hashes are identical, the digital signature is verified 376 and the authentication function 365 proceeds to the Compare to Historical Data 377 process. Upon successful verification of the received digital signature 376, the authentication portion of the received block is, if required, optionally deciphered and with the received cleartext authentication metrics compared to corresponding historical authentication metrics 377 stored in the Historical Database 374 for the same consumer and/or VR device 361.

Finally, once the historical authentication data has been garnered and compared to the received authentication data 377, the Confirm Authentication Data 378 process begins ultimately terminating in a "yes" or "no" decision of whether the consumer and associated VR Device 341 have been acceptably authenticated or not. When the process 378 concludes that the consumer and associated VR Device 341 have been acceptably authenticated, the process terminates, and the pending wager and associated game play is allowed to continue 379 unabated.

Figure 3G:
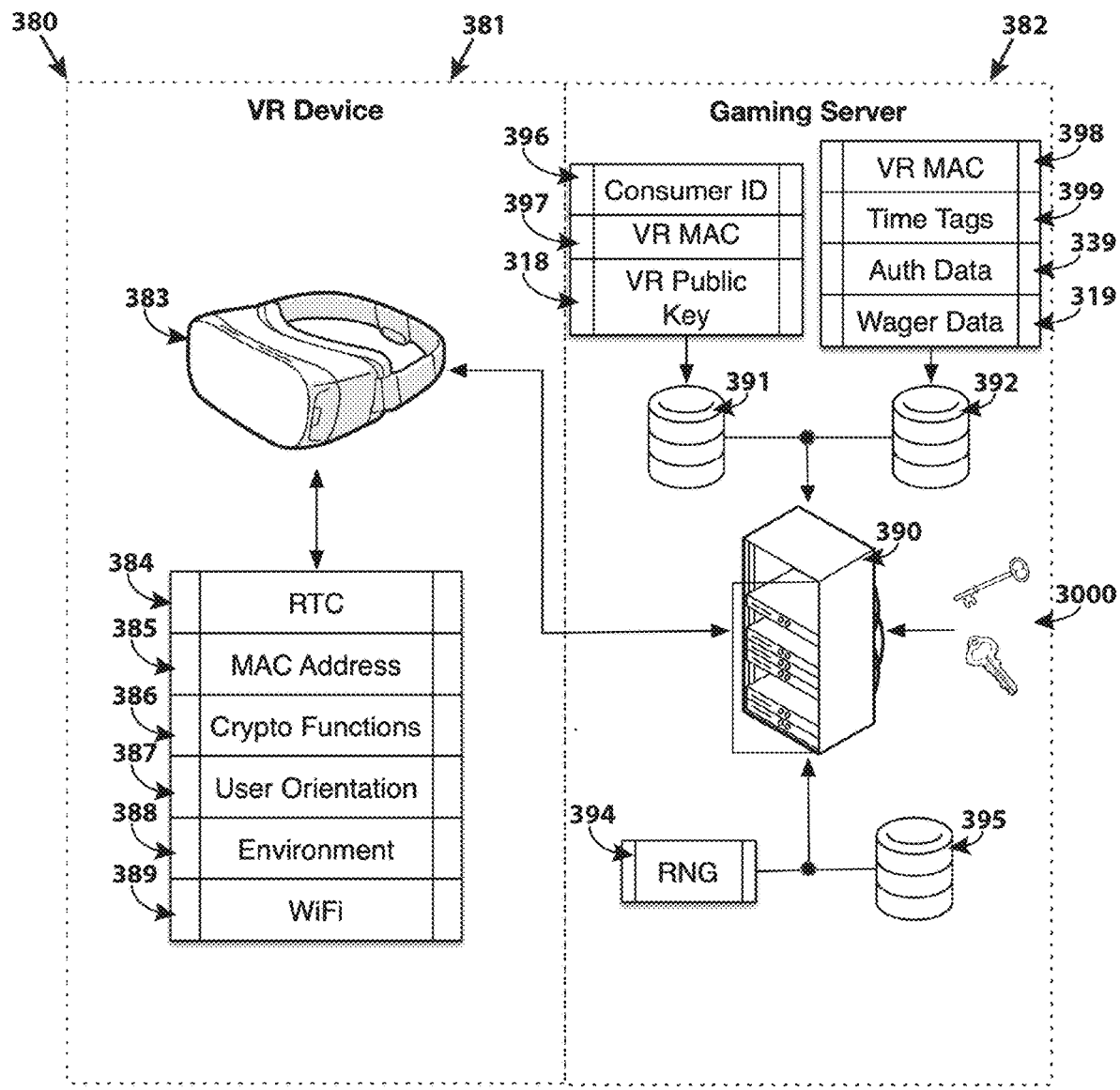
FIG. 3G is a representative example swim lane high level hardware architecture diagram of the key components associated with the system representative swim lane block diagrams of FIGS. 3A thru 3F.

FIG. 3G is a representative example swim lane high-level hardware architecture diagram 380 of the key components associated with the strong multi-level authentication process system representative block diagrams of FIGS. 3A thru 3F. Similar to before, FIG. 3G is presented as a swim lane flowchart divided into two groups (i.e., "VR Device" 381 and "Gaming Server" 382) by the two swim lane columns as shown. As shown, the VR Device 381 swim lane features an exemplary model of an off-the-shelf VR device 383 which is minimally equipped with an embedded Real Time Clock ("RTC") 384, at least one assigned Mac Address 385 and/or other unique identifier, a Cryptographical Functions library 386 (portions of which may be embodied as hardware), various sensors (e.g., accelerometers, gyros) for determining the User's Orientation 387, various sensors (e.g., cameras, ultrasonic) for determining the immediate Environment 388, and a Wi-Fi (a.k.a. IEEE 802.11) receiver and transmitter 389 primarily for communicating with the game server 390 over the Internet. Preferably, the VR device 383 would communicate with the game server 390 via a point-to-point Virtual Private Network (VPN) with some sort of authentication protocol (e.g., Challenge-Handshake Authentication Protocol or "Chap", Extensible Authentication Protocol or "EAP", etc.) between the VR device 383 and the game server 390.

The game server 390 includes a VR database 391, a historical database 392, a separate database 395 for storing predetermined outcomes for Class II gaming, a public and private cryptographic key pair 3000, and a RNG 394 for Class III gaming. The VR database 391 would typically include a set of Consumer IDs 396 uniquely documenting all valid consumers or users of the system, a parallel set of VR Macs 397 and/or other unique VR device 383 identifiers where each VR Mac 397 is preferably linked to at least one Consumer ID 396, and the collection of each VR Public Key 318 assigned to a specific VR device 383 via its VR Mac 397 and/or other identifier. The historical database 392 is predominately a collection of all previous Authentication Data 339 and optionally Wager Data 319 that has been previously processed by the game server 390 preferably organized at least by the Consumer ID 396, VR Mac 398 and/or other identifier as well as the Time Tag 399 of when the Authentication Data 339 was processed.

Of course, as is apparent to one skilled in the art in lieu of this disclosure, there are other high-level hardware architectures that may be more desirable under some circumstances. For example, the VR Device 381 may also include Global Positioning System ("GPS") hardware thereby providing an additional locational authentication metric with the disadvantage of added complexity. Additionally, in another exemplary alternative embodiment, at least a portion of the plurality of databases (i.e., VR database 391, historical database 392, and Class II predetermined outcomes database 395) resident on the game server 390 can be optionally combined into one database, thus simplifying the hardware architectural design with the possible disadvantages of lower security and less flexibility to share authentication data across multiple gaming service providers.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A method of multi-factor authenticating a plurality of users who wager on outcomes dispensed by a central gaming server while being displayed on video displays that are viewable by Virtual Reality (VR) devices, and monitoring of the outcomes and status of wagers using the VR devices, each of the outcomes being represented in immersive virtual reality, the VR devices including orientation, acceleration, and dimensional sensors, each VR device being operated by, and associated with, an associated user, the method comprising:

(a) maintaining in at least one database on the gaming server that dispenses the outcomes:
  (i) unique user identifiers providing a complete listing of all valid users of the system,
  (ii) unique VR device identifiers providing a complete listing of all valid VR devices with access to the system,
  (iii) a plurality of historical multi-factor authentication metrics associated with each user and VR device accessing the gaming sever,
  (iv) cryptographic public keys for authenticating each VR device accessing the gaming server, and
  (v) a cryptographic private and public key pair unique to the gaming server;
(b) capturing, by the user's VR device the:
  (i) ancillary data including the status of the pending wager,
  (ii) dimensional and locational authentication metrics of the real world environment surrounding the VR device from at least the orientation and dimensional sensors, and
  (iii) user authentication metrics from at least the orientation, acceleration, and dimensional sensors;
(c) cryptographically digitally signing by the user's VR device, at least one of the captured authentication metrics using the user's VR device's private key, and electronically communicating the digitally signed authentication metrics and ancillary data to the gaming server;
(d) comparing the data received by the gaming server from the VR device by:
  (i) accessing the VR device's public key from the at least one database on the gaming server by referencing the VR device's unique identifier and verifying the received digital signature, thereby authenticating the VR device and the data received by the gaming server,
  (ii) accessing the VR device's historical multi-factor authentication metrics from a historical database on the at least one database on the gaming server and comparing the received VR device multi-factor authentication metrics to the retrieved historical multi-factor authentication metrics, thereby authenticating the VR device, and
  (iii) accessing the user's historical multi-factor authentication metrics associated with each user from the historical database on the at least one database and comparing the received user device multi-factor authentication metrics to the retrieved historical multi-factor authentication metrics, thereby authenticating the user;
(e) fetching at least one outcome from the gaming server and cryptographically digitally signing the fetched at least one outcome with the gaming server's private key, and electronically communicating the digitally signed at least one outcome to the VR device; and (f) verifying the digital signature of the received at least one outcome with the gaming server's public key and displaying on the VR device, in immersive virtual reality, the at least one outcome.

2. The method of claim 1 wherein the outcomes are pulled from at least one pool of predetermined outcomes stored on a gaming server database.

3. The method of claim 2 wherein the outcomes are used to control the results of a virtual reality representation of a pull-tab or instant game.

4. The method of claim 2 wherein the predetermined outcomes constitute virtual Bingo cards.

5. The method of claim 2 wherein the predetermined outcomes are used to control the call numbers of a virtual reality Bingo game.

6. The method of claim 2 wherein step (e) further comprises using a Random Number Generator (RNG) to randomly or pseudorandomly select at least one predetermined outcome from the pool of pluralities of predetermined outcomes.

7. The method of claim 1 wherein the outcomes are generated in real time by a Random Number Generator (RNG).

8. The method of claim 7 wherein the RNG outcomes are used to control the results of a virtual reality craps game.

9. The method of claim 1 wherein the unique VR device identifier is a Media Access Control (Mac) address.

10. The method of claim 1 wherein step (d) further comprises fuzzy logic utilized for at least a portion of the authentication metrics comparisons.

11. The method of claim 10 wherein the fuzzy logic utilized for at least a portion of the authentication metrics comparisons includes variable thresholds dependent on the amount of the pending wager.

12. The method of claim 1 wherein step (d) further comprises calculating the mean average and the standard deviation for at least one type of historical metrics and comparing the received compatible type metric to the calculated historical mean average and standard deviation.

13. The method of claim 12 wherein a received metric is deemed authenticated if its value falls within the range of the historical mean average plus-or-minus one standard deviation.

14. The method of claim 12 wherein a received metric is deemed authenticated if its value falls within the range of the historical mean average plus-or-minus two standard deviations.

15. The method of claim 12 wherein a received metric is deemed authenticated if its value falls within the range of the historical mean average plus-or-minus one, two, or three standard deviations depending on the amount of the pending wager.

16. The method of claim 1 wherein the ancillary data includes a time tag.

17. The method of claim 1 wherein the ancillary data includes an indicator bit determining whether the pending wager is an initial wager or part of an ongoing session.

18. The method of claim 17 wherein both obtrusive and non-obtrusive authentication metrics are required for an initial session authentication and only non-obtrusive authentication metrics are required for an ongoing session authentication.

19. The method of claim 1 wherein one of the received authentication metrics is the user's height and position.

20. The method of claim 1 wherein the historical database is maintained in a hash chain.

* * * * *